(12) United States Patent
Sugiyama et al.

(10) Patent No.: US 6,262,779 B1
(45) Date of Patent: Jul. 17, 2001

(54) DISPLAY APPARATUS WITH CIRCUIT EXPANDING HORIZONTAL RETRACE INTERVAL OF HORIZONTAL DEFLECTION CURRENT

(75) Inventors: Masato Sugiyama; Makoto Onozawa, both of Yokohama; Kazuhiro Kaizaki, Odawara; Mitsuo Nakajima, Yokohama; Yuzo Nishinaka, Chigasaki; Junji Motoshima, Fujisawa, all of (JP)

(73) Assignee: Hitachi, LTD, Tokyo (JP)

( * ) Notice: Subject to any disclaimer, the term of this patent is extended or adjusted under 35 U.S.C. 154(b) by 0 days.

(21) Appl. No.: 09/248,001

(22) Filed: Feb. 10, 1999

(30) Foreign Application Priority Data

| Feb. 10, 1998 | (JP) | 10-028773 |
| Apr. 13, 1998 | (JP) | 10-101095 |
| Jul. 3, 1998 | (JP) | 10-189387 |
| Jul. 7, 1998 | (JP) | 10-191245 |

(51) Int. Cl.$^7$ ............... H04N 9/45; H04N 7/01; H04N 3/24; H04N 3/223; H09G 1/04

(52) U.S. Cl. ............. 348/704; 348/556; 348/445; 348/913; 348/557; 348/634; 348/704; 315/364

(58) Field of Search ............... 348/556, 557, 348/561, 445, 913, 634, 635, 637, 704, 739; 315/364; H04N 9/45, 7/01, 3/24, 3/223

(56) References Cited

U.S. PATENT DOCUMENTS

| 4,282,546 | * | 8/1981 | Reitmeier | 358/22 |
| 4,631,574 | * | 12/1986 | LoCicero et al. | 358/12 |
| 5,103,308 | * | 4/1992 | Asano | 358/140 |
| 5,113,441 | * | 5/1992 | Harada | 380/15 |
| 5,218,436 | | 6/1993 | Sugiyama et al. | |
| 5,298,983 | * | 3/1994 | Sano | 348/557 |
| 5,434,625 | * | 7/1995 | Willis | 348/564 |
| 5,461,431 | * | 10/1995 | Takebuchi et al. | 348/806 |
| 5,471,251 | * | 11/1995 | Inaba et al. | 348/634 |
| 5,519,447 | * | 5/1996 | Shima et al. | 348/556 |
| 5,638,485 | * | 6/1997 | Kobayashi et al. | 386/123 |
| 5,748,259 | * | 5/1998 | Kang | 348/634 |
| 6,014,179 | * | 1/2000 | Kobayashi et al. | 348/556 |
| 6,064,445 | * | 5/2000 | Kim et al. | 348/581 |

FOREIGN PATENT DOCUMENTS

| 53-51922 | 11/1978 | (JP) . |
| 3-76493 | 4/1991 | (JP) . |

* cited by examiner

*Primary Examiner*—Reinhard J. Eisenzopf
*Assistant Examiner*—Paulos Natnael
(74) *Attorney, Agent, or Firm*—Antonelli, Terry, Stout & Kraus, LLP

(57) ABSTRACT

A display apparatus for a television or computer terminal having a cathode ray tube with a deflection coil. The display apparatus includes a signal processing circuit which compresses a display period in a horizontal scanning period of an input video signal and which expands a blanking interval of the horizontal scanning period of the video signal, the signal processing circuit providing an output of the video signal to the cathode ray tube, and a horizontal retrace interval expansion circuit which expands a horizontal retrace line interval of a horizontal deflection current for the deflection coil of the cathode ray tube in accordance with the blanking period expanded by the signal processing circuit. The cathode ray tube displays the input video signal in accordance with the output of the signal processing circuit and the output of the horizontal retrace interval expansion circuit.

25 Claims, 17 Drawing Sheets

(a)

(b)

(c)

(d)

DISPLAY APPARATUS WITH CIRCUIT EXPANDING HORIZONTAL RETRACE INTERVAL OF HORIZONTAL DEFLECTION CURRENT

The present invention relates to a display apparatus such as for a television set or a computer terminal of a PC (Personal Computer) using a CRT (Cathode Ray Tube).

BACKGROUND OF THE INVENTION

As a method of driving a display apparatus, such as a CRT in a television set, deflection using a saw tooth wave is normally performed. In the case of, for example, horizontal scanning, a horizontal effective area is scanned at the leading edge of a saw tooth wave to display from the left end to the right end on a screen. On the other hand, the trailing edge becomes a retrace line interval for the horizontal scanning to return from the right end to the left end on the screen. At this time, video blanking is applied so that the scanning line, which returns, is not displayed. This horizontal retrace line interval is set to about 15% of the horizontal scanning interval.

In recent years, the screen of a television set tends to become larger, wide aspect displays have become widespread, and enlargement of the screen size has been proceeding. Demand for television sets with a small depth dimension (thin) in addition to a large screen is increasing.

The horizontal frequency of NTSC signals of an interlace scanning system is set to be 15.75 kHz. In contrast to that, the horizontal frequency of NTSC signals converted into a progressive scanning system (a line sequential system) is set to be 31.47 kHz. The use of this progressive scanning system has the advantage of being capable of reducing flickers of displayed pictures and providing images of high quality. Also, video signals having a higher horizontal scanning frequency than the conventional television signal are also increasing as in the case of highvision signals, PC signals and the like, and the horizontal deflection frequency tends to increasingly become a higher frequency.

Japanese Patent Laid-open Application No. Hei 3-76493 discloses a time axis compression apparatus for a television set for realizing such a progressive scanning system. In accordance therewith, it is possible to realize a progressive scanning system. Furthermore, this prior art makes it possible to compress the time axis of video signals in the horizontal period, and to show NTSC signals on a high definition display with their linearity maintained and without having to switch the horizontal deflection current. However, where NTSC signals are converted into a progressive scanning system, the horizontal frequency should be raised to about twice that of the interlace scanning system. Consequently, the current which flows to the horizontal deflecting coil of the deflecting yoke should also be approximately doubled, resulting in the problem of a power increase in the output section of the horizontal deflection circuit.

For this reason, a cost increase of the deflecting circuit, particularly the horizontal deflection circuit such as an increase in the power consumption of the horizontal deflection circuit and an expensive transistor being required has become a significant problem.

SUMMARY OF THE INVENTION

It is an object of the present invention to solve the above-described problems and to provide a display apparatus at a low cost.

It is another object of the present invention is to reduce power consumption occurring in the output section of the horizontal deflection circuit.

In order to achieve the aforementioned objects, a display apparatus such as a television set according to the present invention comprises: a blanking interval extension arrangement for extending a horizontal video blanking interval of a video signal; a deflecting arrangement for extending the retrace line interval within the extended blanking interval; and a display unit driven by the deflecting means, for displaying a video signal from the blanking interval extending extension arrangement.

In accordance with a feature of the present invention, by constructing the television set in the afore-described manner, it is possible to reduce the power consumption of the deflecting circuit by reducing variations of the deflection current with time.

A display apparatus according to the present invention is provided with a horizontal deflection circuit for driving the horizontal deflecting coil of a cathode ray tube, a vertical deflection circuit for driving the vertical deflecting coil of the cathode ray tube, and a video circuit for driving the cathode electrode of the cathode ray tube, and further provided with a signal processing circuit for converting the horizontal display interval of an input video signal and arranged before the video circuit. In addition, the ratio of the horizontal retrace interval to the horizontal period of the horizontal deflection circuit is set on the basis of the converted video signal outputted from this signal processing circuit.

According to a feature of the invention, the signal processing circuit is provided with a time axis conversion circuit for converting the ratio of the horizontal display interval to the horizontal period of the input video signal. Further the signal processing circuit is provided with an I/P (Interlace/Progressive) conversion circuit for ago converting a video signal of an interlace scanning system into a video signal of a progressive scanning system, and the ratio of the horizontal display interval to the horizontal period of the I/P converted signal is converted by the time axis conversion circuit.

In accordance with another feature of the present invention, a synchronizing pulse separation circuit is provided after the signal processing circuit, and the synchronizing signal for the converted video signal outputted from the signal processing circuit is separated by this synchronizing pulse separation circuit and supplied to the horizontal deflection circuit.

These and other objects, features and advantages of the present invention will become more apparent from the following description when taken in conjunction with the accompanying drawings.

DESCRIPTION OF THE PREFERRED EMBODIMENTS

Figure 1:
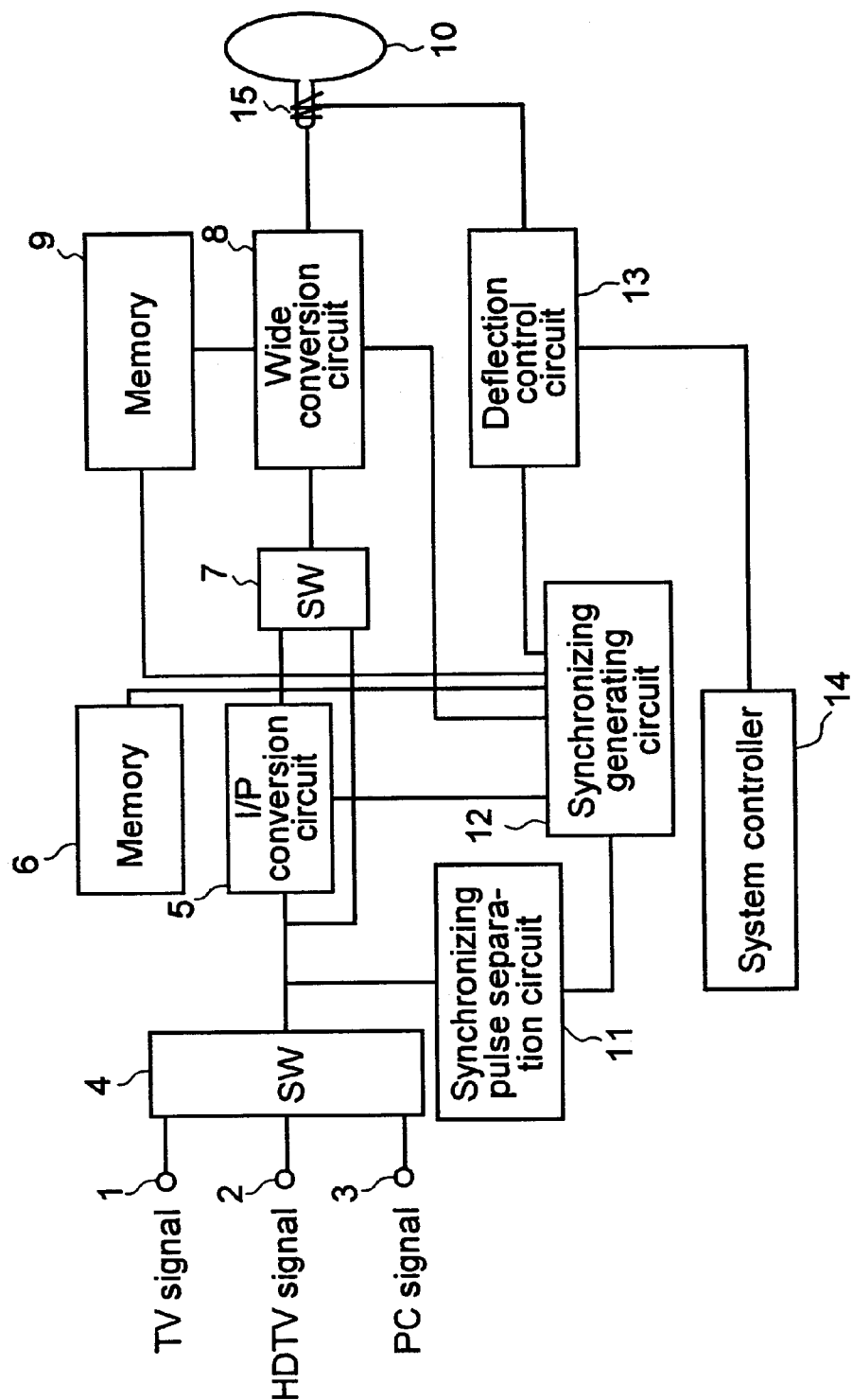
FIG. 1 is a block diagram showing a first embodiment of a display apparatus according to the present invention.

FIG. 1 shows to a block diagram of an embodiment of the present invention, wherein numeral 1 designates a television signal input terminal; numeral 2, a HDTV signal input terminal; numeral 3, a PC signal input terminal; numerals 4 and 7, switches; numeral 5, an I/P (Interlace/Progressive) conversion circuit; numerals 6 and 9, memories; numeral 8, a wide conversion circuit; numeral 10, a wide aspect CRT; numeral 11, a synchronizing pulse separation circuit; numeral 12, a synchronizing generating circuit; numeral 13, a deflection control circuit; and numeral 14, a system controller for controlling the operation of this system in response to a display signal to be displayed.

A NTSC signal, a highvision signal and a PC signal inputted into the input terminals 1, 2 and 3, respectively, are selected by the switch 4, and any of these signals is outputted therefrom. When, for example, the NTSC signal is selected by the switch 4, and is supplied to a motion-adaptable type I/P conversion circuit 5, the NTSC signal is converted from the interlace scanning to the progressive scanning. The motion-adaptable type I/P conversion circuit 5, is described, for example, in Japanese Patent Laid-Open Application No.2-81588, and its detailed description is omitted herein. The memory 6 is used to store NTSC signals for one field, placed by one field at the front thereof, and a signal from the memory 6 is used to generate an interpolating scanning line for still pictures by the I/P conversion circuit 5. The switch 7 is switched so as to select either the input to or the output from the I/P conversion circuit 5. A television signal supplied to a wide conversion circuit 8 is converted from a standard aspect to a wide aspect by changing a write frequency into a memory 9 and a read-out frequency from the memory 9, and is supplied to the wide aspect CRT 10 through a video amplifier (not shown).

In the synchronizing pulse separation circuit 11, a horizontal synchronizing signal and a vertical synchronizing signal are extracted from the NTSC signal selected by the switch 4, and are supplied to the synchronizing generating circuit 12. The synchronizing generating circuit 12 generates various pulses for driving the television set on the basis of the horizontal synchronizing signal and vertical synchronizing signal. A reset pulse, a gate pulse indicating the beginning and end of writing into the memory 6, and the like are supplied from the synchronizing generating circuit 12 to the memory 6. Also, the I/P conversion circuit 5 is supplied with a pulse and the like for doubling the scanning speed after an interpolating operation (interpolating operation such as intra-field interpolation and inter-field interpolation). From the synchronizing generating circuit 12, a reset pulse and the like are supplied to the memory 9, and a write gate pulse, a read gate pulse and the like are supplied to the wide conversion circuit 8. Furthermore, from the synchronizing generating circuit 12, horizontal and vertical synchronizing signals are supplied to the deflection control circuit 13, and horizontal and vertical deflection current is supplied to a deflection coil 15. The system controller 14 controls the circuit so that the television set operates so as to exercise control as a whole. It controls the switches 4, 7 in response to a state as to which signal should be selected of signals inputted to the terminals 1, 2 and 3 on the basis of a signal from, for example, a remote controller (not shown).

When a HDTV signal supplied to the input terminal 2 is selected by the switch 4, this HDTV signal is caused by the switch 7 to by-pass the I/P conversion circuit 5, and is inputted into the wide conversion circuit 8. In the wide conversion circuit 8, the read-out frequency or a number of samples is changed with respect to the write frequency, and is supplied to the CRT 10.

When a PC signal supplied to the input terminal 3 is selected by the switch 4, this signal is caused by the switch 7 to by-pass the I/P conversion circuit 5, and is supplied to the wide conversion circuit 8, and is converted into a wide aspect to be supplied to the CRT 10.

The wide conversion circuit 8 is a circuit to correct a NTSC signal having an aspect ratio of 4:3 into 16:9, which is the aspect ratio of a wide aspect display.

Figure 2:
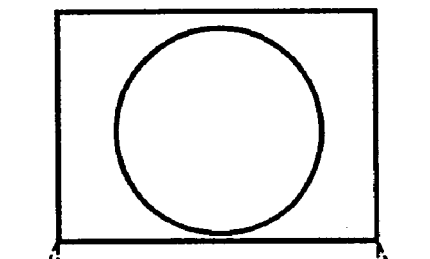
FIG. 2 shows front views (a)–(d) of a CRT for illustrating wide conversion and blanking extension according to the present invention.
Figure 2:
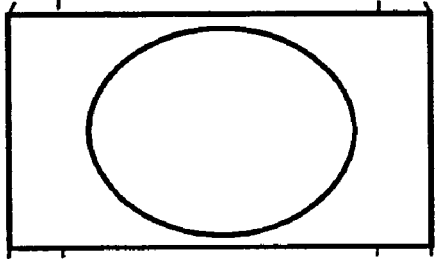
Figure 2:
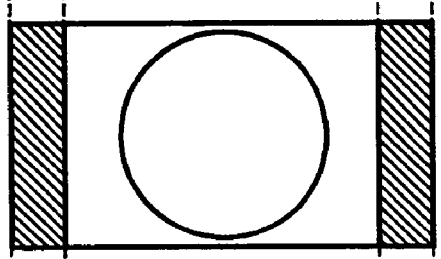
Figure 2:
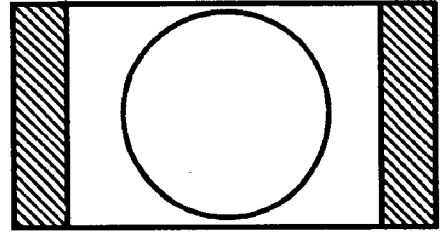
Figure 3:
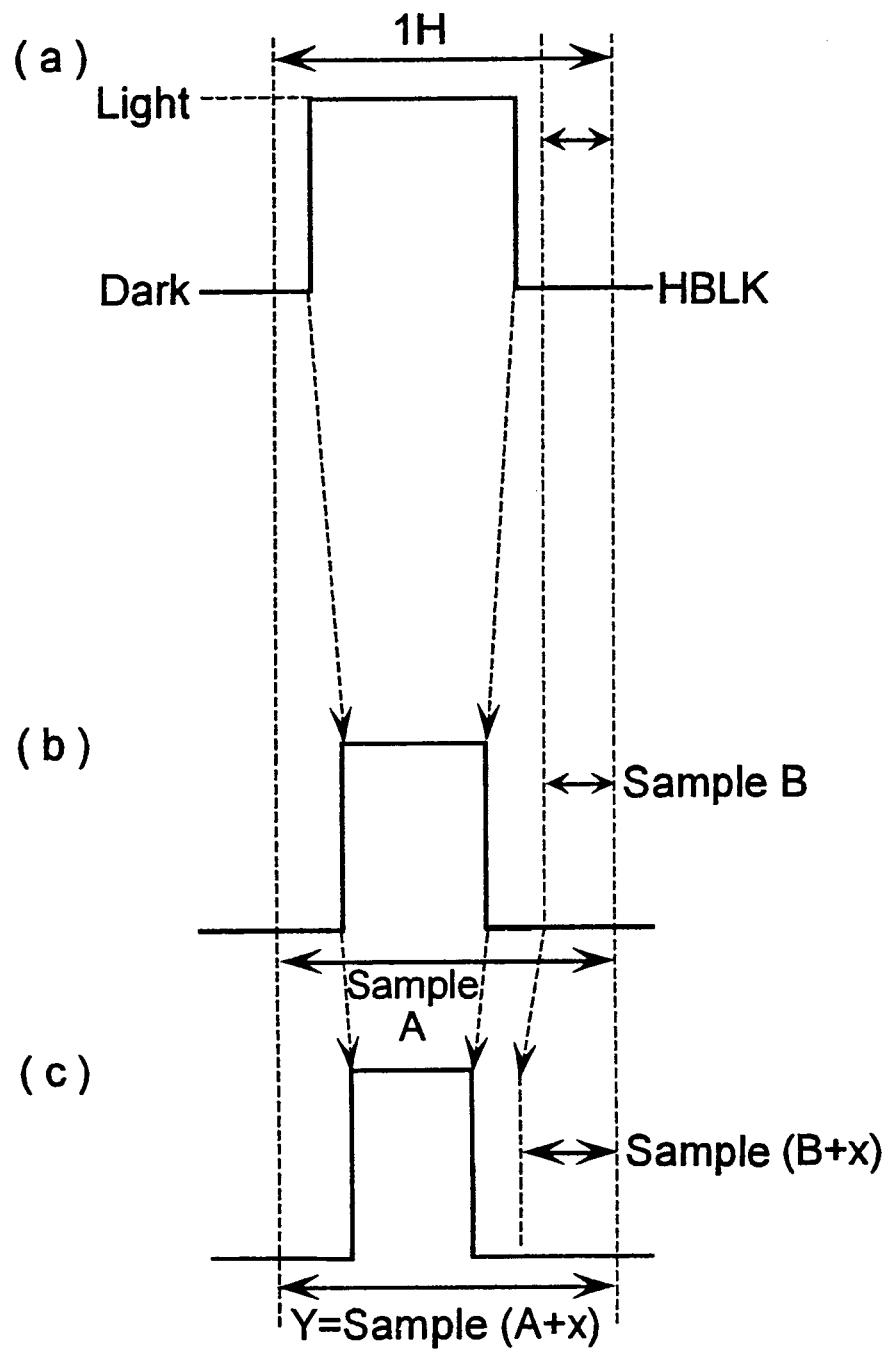
FIG. 3 show schematic waveforms (a)–(c) for illustrating wide conversion and blanking extension according to the present invention.

FIGS. 2(a)–2(d) are front views of a CRT for explaining wide conversion and blanking extension according to the present invention, and FIGS. 3(a)–(c) are schematic views for explaining the wide conversion and blanking extension according to the present invention.

When, for example, a standard circular aspect image as shown in FIG. 2(a) is displayed on a wide aspect CRT 10, the circular shape is extended from side to side and is displayed on the wide aspect CRT 10 as shown in FIG. 2(b). In order to prevent such extension, a video signal to be displayed can be temporally compressed to 3/4 times for display. When performed in this manner, a normal circle as shown in FIG. 2(c) is displayed on the CRT 10. In order to temporally compress a video signal to be displayed to 3/4 times, the read rate can be set to about 4/3 times the write speed into the memory 9. By changing the read rate in this manner, it becomes possible to display a standard aspect screen on a portion about 3/4 times the wide aspect CRT 10 as shown in FIG. 2(c). The ratio of "3/4 times" is calculated from the wide display of ratio of 16:9 with respect to the standard aspect ratio of 4:3 which corresponds to a ratio of 12:9, and therefore, it is apparent that it is necessary to provide a compression ratio of 12/16 times or 3/4 times. When, as an example of the write frequency, 910 times the horizontal scanning frequency fh is conventionally used, a frequency required for progressively scanning in the NTSC system for writing becomes about 28.6 MHz, and therefore, about 38.2 MHz which is 4/3 times about 28.6 MHz, can be used as the read-out frequency.

In this embodiment, the blanking interval is simultaneously extended at the time of this wide conversion.

In FIG. 2(a), when, assuming that the interior of the circle is light while the other portion is dark, the brightness of a horizontal line passing through the center of the circle is schematically displayed and is represented as shown in FIG. 3(a). In FIG. 3(a), 1H represents one horizontal scanning period, and HBLK represents a horizontal blanking interval. When the standard aspect image shown in FIG. 2(a) is corrected and is displayed as shown in FIG. 2(c) on the wide aspect CRT 10, the diameter portion (light portion) of the circle on the screen in the horizontal direction has a relatively short display time with respect to the other portion (dark portion) as shown in FIG. 3(b). In other words, when the state of FIG. 2(a) is changed into the state of FIG. 2(c), the diameter portion (light portion) of the circle is reduced as shown in FIG. 3(b).

In FIG. 3(b) which corresponding to FIG. 2(c), assuming the number of data for one horizontal scanning period is sample A, and the number of data for the horizontal blanking is sample B, a blanking ratio α a can be represented by (α=B/A). In order to increase the blanking ratio by "n" times, and also not to decrease the number of samples to be displayed as shown in FIG. 3(c), the total number of samples and the number of samples within the blanking interval can be increased. Assuming the number of samples to be increased is x, the total number Y of samples can be determined in the following manner:

New blanking ratio=$n \times \alpha = (B+x)/Y$
where $Y=A+x$, that is, $x=Y-A$
Accordingly, $n \times \alpha = (B+Y-A)/Y$
Hereinafter, by deforming, $(n \times \alpha)Y = B+Y-A$
$Y=(A-B)/(1-n\alpha)$
$=(1-\alpha)A/(1-n\alpha)$ Accordingly, in order to extend the blanking interval, the read-out frequency of a video signal from the memory 9 can be increased by $(1-\alpha)/(1-n\alpha)$ times. When displaying a standard aspect NTSC signal on a wide aspect CRT 10, generally A has 1,200 samples and B has about 200 samples, and therefore, $\alpha = 1/6$. In the case of extending this by about 1.5 times, $(1-1/6)/(1-3/2 \times 1/6) = 10/9$ is obtained, and only increasing the read rate by about 10% will suffice. Even if the blanking interval is extended, it is possible to display with high image quality maintained without reducing the number of samples to be displayed.

FIG. 3(c) shows a state obtained by further extending the horizontal blanking interval from the state shown in FIG. 3(b). In this case, the horizontal scanning time becomes shorter, but the horizontal scanning range can be made identical between FIG. 3(b) and FIG. 3(c) by making the peak value of the horizontal scanning current identical. In the case of making only the horizontal scanning interval shorter, the image quality will be deteriorated, but it is possible to prevent the image quality from being deteriorated by increasing the number of samples of a video signal, i.e., the read-out frequency in the wide conversion circuit 8. Therefore, it is possible to make the display itself identical to the display of FIG. 2(c) as shown in FIG. 2(d) even if the horizontal blanking interval is increased.

When the horizontal blanking interval is increased as shown in FIG. 3(c), it is necessary to change the deflection current outputted from the deflection control circuit 13. For this reason, a control signal is supplied from the system controller 14 to the deflection control circuit 13. More specifically, by the use of an algorithm of the system controller 14, it is possible to change the horizontal deflection current and to control the deflection control circuit 13 without changing the horizontal scanning area. Also, an adjustment knob is provided on the front of the television set, and by adjusting this knob, it is possible to change the algorithm of the system controller 14 for adjusting the value of the horizontal blanking interval.

As described above, when the blanking interval is extended to about 1.5 times the conventional blanking interval, the retrace line interval also can be extended to about 1.5 times. For this reason, since voltage induced by the horizontal deflection coil 15 is the product of the inductance L of the coil and the amount of change of the current with respect to time, the retrace line interval has been set to about 1.5 times, whereby it becomes possible to cause the voltage to fall into the same induced voltage even if the inductance L is set to 1.5 times. In the case of making the deflecting angle identical, since it is possible to reduce the deflection current by making the inductance L large, it becomes possible to apply the same low-standard components as conventionally utilized, for example, in a horizontal output circuit even when a progressively scanned NTSC signal is displayed, thus making it possible to reduce the price for the deflecting circuit.

When a HDTV signal (highvision signal, for example), rather than an NTSC signal as described above, is selected by the switch 4, since the switch 7 selects the output side of the switch 4, the HDTV signal bypasses the I/P conversion circuit 5, and is supplied to the wide conversion circuit 8. The wide conversion circuit 8 does not convert the aspect ratio as in the operation described for the NTSC signal, but rather performs only a process for extending the horizontal blanking interval. That is, the wide conversion circuit changes the read-out frequency from the memory 9 to increase the number of samples. Although the actual actuating frequency differs from that of the NTSC signal, both operations are the same in the calculation of the number of increased samples resulting from extended blanking interval, and therefore, the detailed description thereof is omitted.

In the case of selecting the PC signal by the switch 4 rather than the NTSC signal or the HDTV signal as described above, the processing is the same as in the case of processing the NTSC signal other than the switch 7 selects the output side of the switch 4, and the PC signal bypasses the I/P conversion circuit 5, and is supplied to the wide conversion circuit 8.

As described above, the power consumption for the deflecting circuit is reducible by extending the horizontal blanking interval of a video signal which is inputted. Therefore, the deflecting circuit, particularly the horizontal deflecting circuit can be constituted by low-price components for the implementation of low-priced television sets.

Although, as the television signal, the NTSC signal has been utilized as an example and described, the present invention is not limited thereto, but is also applicable to a case where, for example, a PAL signal or a SECAM signal or the like is inputted, and is displayed by converting into progressive scanning. Similarly, it is apparent that as the HDTV signal, the high vision signal has been exemplified and described, but the present invention is not limited thereto, but is also applicable to a case where, for example, such signals of various formats as utilized in the digital broadcasting system are inputted for displaying. Also, as the PC signal, there are a standard PC signal having a number of effective pixels of 640×480, a SVGA signal having a number of effective pixels of 800×600, and the like, and the present invention is also applicable to these signals.

Also, in the above-description a motion-adaptable type process is performed in order to convert the NTSC signal to progressive scanning, but it may be converted into the progressive scanning by an intra-field process. Furthermore, although the above-description is directed to the case in which a television signal or a PC signal is displayed on a wide aspect CRT 10, the present invention is also applicable to a case where these signals are displayed on a standard aspect CRT. In this case, there can be provided a conversion circuit for converting a read-out frequency from the memory 9 in order to increase the number of samples.

Furthermore, in the case of extending the blanking interval, the rate of blanking interval has been enlarged by increasing the total number of samples by the wide conversion circuit 8 so as not to decrease the number of samples to be displayed. However, the present invention is not limited thereto, and the number of samples for blanking can be increased in conformance with the rate of increase of the horizontal blanking interval without changing the total number of samples. For example, in the case of extending the blanking interval to about 1.5 times for displaying, the number of samples in the blanking interval can be increased to 3/2 times. In this case, there is the merit that the blanking interval can be extended without increasing the read-out frequency from the memory 9.

As described above, the horizontal blanking interval of a video signal is extended, and the deflection control circuit is controlled so that the horizontal scanning line is slowly retraced within this extended interval, whereby a change in the deflection current with time is reduced for reducing the power consumption for the deflecting circuit, and to enable production of a television set at low price.

Figure 4:
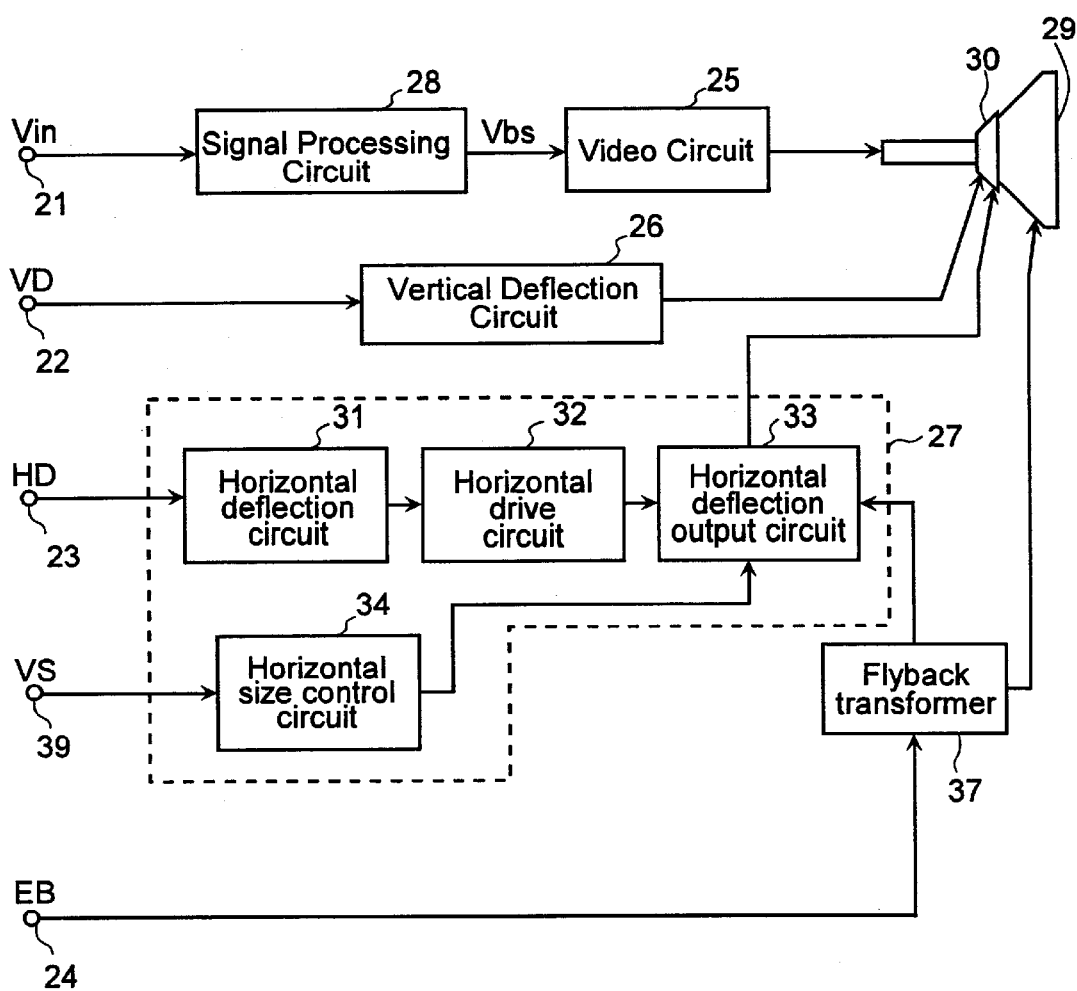
FIG. 4 is a block diagram illustrating another embodiment of the display apparatus according to the present invention.

FIG. 4 is a block diagram illustrating another embodiment of a display apparatus according to the invention. In FIG. 4, numeral 21 denotes a video signal input terminal; 22, a vertical synchronizing signal input terminal; 23, a horizontal signal input terminal; 24, a power supply voltage input terminal; 25, a video circuit; 26, a vertical deflection circuit; 27, a horizontal deflection circuit; 28, a signal processing circuit; 29, a cathode ray tube; 30, a deflecting yoke; 31, a horizontal oscillation circuit; 32, a horizontal drive circuit; 33, a horizontal deflection output circuit; 34, a horizontal size control circuit; 37, a flyback transformer; and 39, a horizontal size control signal input terminal. In FIG. 4, the horizontal deflection circuit 27 consists of the horizontal oscillation circuit 31, the horizontal drive circuit 32, the horizontal deflection output circuit 33, and the horizontal size control circuit 35.

In the signal processing circuit 28, the horizontal display interval of the horizontal period of the input video signal Vin inputted from the video signal input terminal 21 is converted, and the signal is outputted as a converted video signal Vbs. In the video circuit 25, the converted video signal Vbs is amplified, and supplied to the cathode electrode of the CRT 29 as a cathode voltage.

The vertical deflection circuit 26 enables a vertical deflection current synchronized with the vertical synchronizing signal VD inputted from the vertical synchronizing signal 22 to flow to a vertical deflecting coil of the deflecting yoke 30. The horizontal deflection circuit 27 includes the horizontal oscillation circuit 31 for outputting a horizontal oscillation signal synchronized with the horizontal synchronizing signal HD inputted from the horizontal synchronizing signal input terminal 23; the horizontal drive circuit 32 for amplifying the horizontal oscillation signal; the horizontal deflection output circuit 33, to which a horizontal drive pulse outputted from this horizontal drive circuit 32 is inputted, for generating a horizontal deflection current; and the horizontal size control circuit 34 which is supplied with the horizontal size control signal VS and connected to the horizontal deflection output circuit 33; and serves to enable the horizontal deflection current to flow to a horizontal deflecting coil of the deflecting yoke 30. In this horizontal deflection circuit 27, the amplitude of the horizontal deflection current is controlled with the horizontal size control signal VS inputted from the horizontal size control circuit 34 connected to the horizontal deflection output circuit 33.

A feature of the embodiment illustrated in FIG. 4 is that there is provided the signal processing circuit 28 for converting the horizontal display interval of the input video signal Vin and the ratio of the horizontal retrace interval to the horizontal period is set in the horizontal deflection circuit 27 on the basis of the converted video signal Vbs outputted from this signal processing circuit 28.

Figure 5:
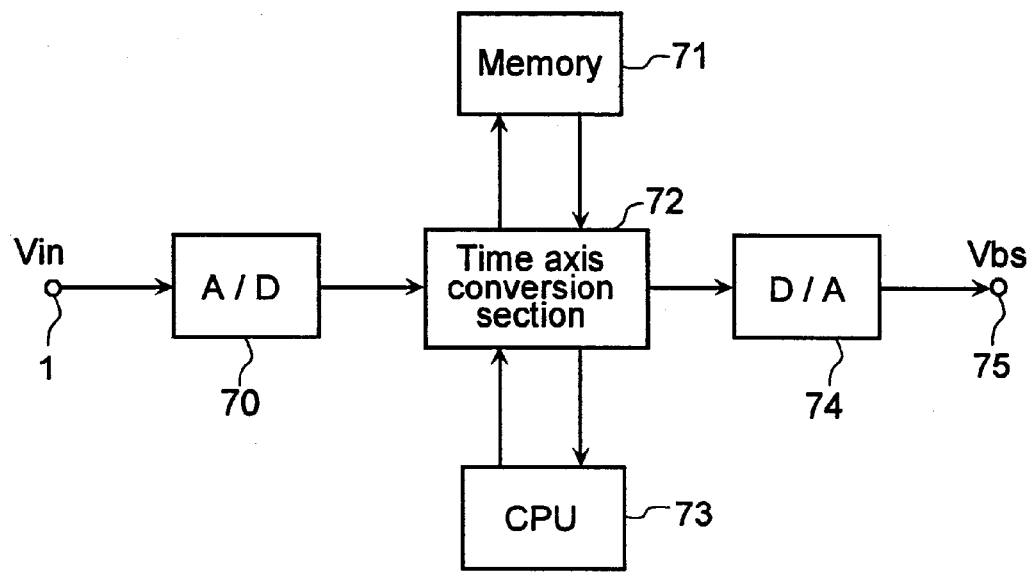
FIG. 5 is a block diagram illustrating an embodiment of the signal processing circuit in FIG. 4.

FIG. 5 is a block diagram illustrating an embodiment of the signal processing circuit 28 of FIG. 4, wherein numeral 70 denotes an A/D converter; 71, a memory; 72, a time axis conversion section; 73, a CPU; 74, a D/A converter; and 75, a converted video signal output terminal. The A/D converter 70 subjects the input video signal Vin inputted from the video signal input terminal 21 to A/D conversion (analog-to-digital conversion), and supplies the converted signal to the time axis conversion section 72. A time axis conversion circuit includes the memory 71, the time axis conversion section 72 and the CPU 73 and the time axis conversion section 72 and in response to an instruction from the CPU 73, writes a digital signal outputted from the A/D converter 70 into the memory 71. Also the time axis conversion section 72, in response to an instruction from the CPU 73, reads out the video signal written into the memory and digitized, and supplies the read out signal to the D/A converter 74. The D/A converter 74 converts the digital signal outputted from the time axis conversion section 72 into an analog signal, and supplies it to the converted video signal output terminal 75. In the circuit illustrated in FIG. 5, the time axis conversion section 72 enables conversion of the horizontal display interval by varying the speed of writing into the memory 71 and the speed of reading out of the memory 71. For instance, if the speed of reading out of the memory 71 is made faster than the speed of writing into the memory 71, the horizontal display interval is shortened or compressed.

When using a memory as the memory 71 for storing a video signal corresponding to one vertical scanning period, a sampling clock frequency of the memory 71 can be set optionally. However, when using only a FIFO memory as the memory 71 which for storing the video signal corresponding to one horizontal scanning period, a sampling clock frequency of the memory 71 is conventionally selected in the following manner. When ratio of a frequency of an input sampling clock (frequency of sampling clock to write the video signal in the memory) and a frequency of an output sampling clock (frequency of the sampling clock to read the stored video signal from the memory) is M:N (M<N; M and N are an integer), both of a number of the input sampling clock and a number of the output sampling clock in one horizontal scanning period are made a common multiple of M and N, because when using only the FIFO memory as the memory 71, the memory 71 needs to be reset every one horizontal scanning period. When the number of the input sampling clock and the number of the output sampling clock in one horizontal scanning period are not made, the common multiple of M and N, the rest on the phase of the input side and output side changes every horizontal scanning period, and an operation of the memory 71 becomes unstable.

Figure 6:
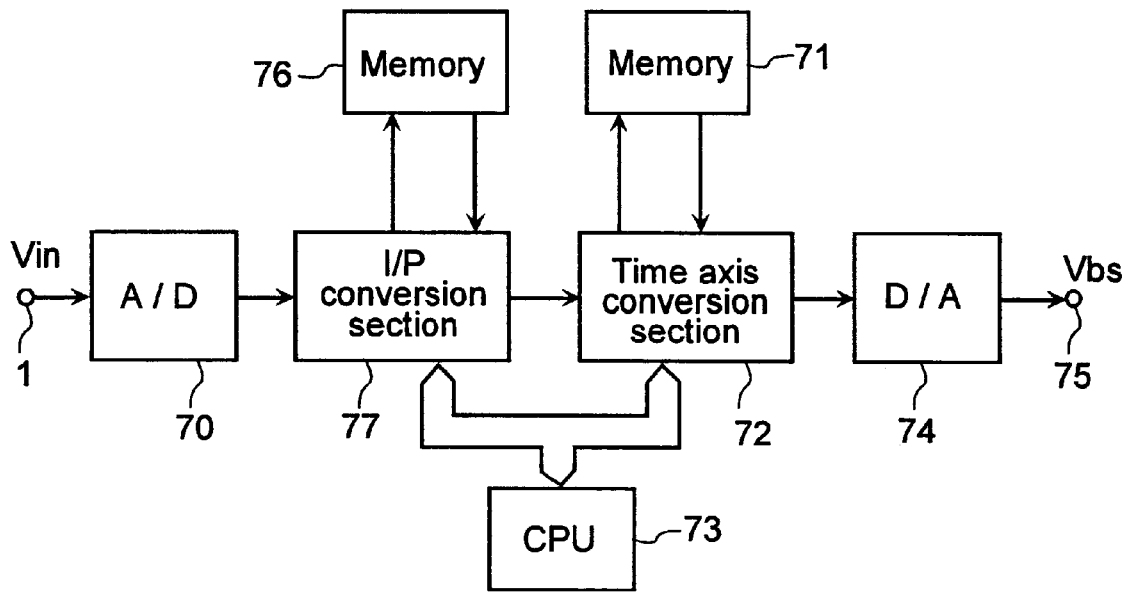
FIG. 6 is a block diagram illustrating another embodiment of the signal processing circuit in FIG. 4.

FIG. 6 is a block diagram illustrating another embodiment of the signal processing circuit 28 of FIG. 4. In FIG. 6, numeral 76 denotes a memory, and 77, an interlace/progressive conversion section (hereinafter called the I/P conversion section). The signal processing circuit 28 illustrated in FIG. 6 has a function to convert the input video signal Vin, when it is in an interlace scanning system, into a progressive scanning system (a line sequential system). An I/P conversion circuit includes the I/P conversion section 77, the CPU 73 and the memory 76. The I/P conversion is effected based upon an instruction from the CPU 73, using the I/P conversion section 77 and the memory 76. Furthermore, conversion of the horizontal display time is effected using the time axis conversion section 72 and the memory 71, with the signal from section 72 being converted into an analog signal by the D/A converter 72 and outputted to the converted video signal output terminal 75. By using the circuit illustrated in FIG. 6, not only can NTSC and other signals of an interlace scanning system be converted into a progressive scanning system, but also the horizontal display interval can be converted.

Figure 7:
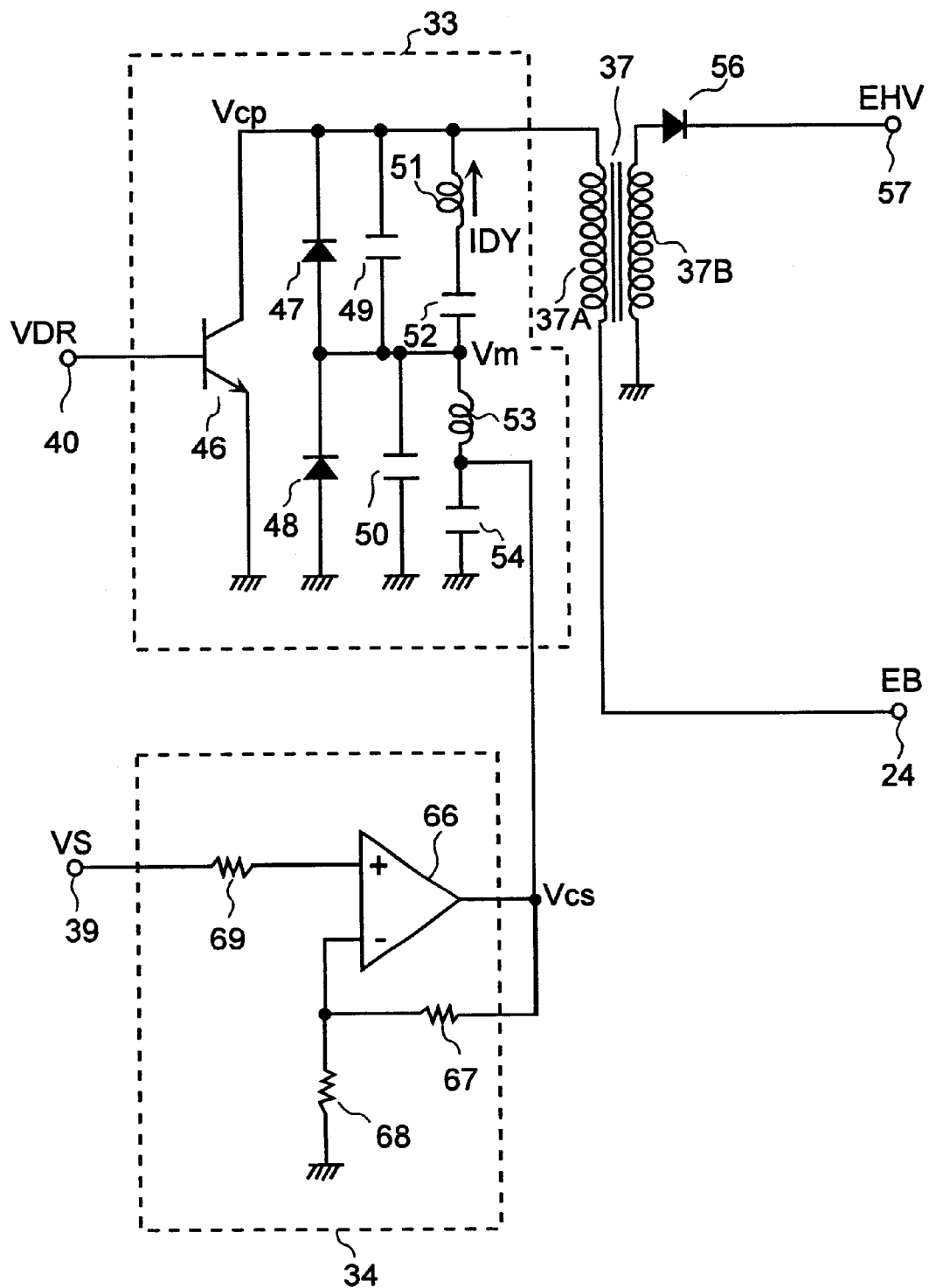
FIG. 7 is a circuit diagram illustrating an embodiment of the horizontal deflection output circuit and the horizontal size control circuit in FIG. 4.

FIG. 7 is a circuit diagram illustrating an embodiment of the horizontal deflection output circuit 33 and the horizontal size control circuit 34 in FIG. 4, wherein the flyback transformer 37 of FIG. 4 includes of a primary winding 37A and a secondary winding 37B. The horizontal deflection output circuit 33 which is connected to a horizontal drive pulse terminal 40 includes a horizontal output transistor 46, a damper diode 47, a modulation diode 48, a first resonance capacitor 49, a second resonance capacitor 50, a horizontal deflecting coil 51, a first S-shaped capacitor 52, a modulating coil 53, a second S-shaped capacitor 54 and a high voltage rectifier diode 56, and its output is supplied to an anode voltage output terminal 57.

The horizontal size control circuit 34 includes an error amplifier circuit 66 and resistors 67, 68 and 69. Further in FIG. 7, VDR denotes a horizontal drive pulse; Vcp denotes the collector voltage of the horizontal output transistor 46; Vm denotes a modulating voltage; IDY denotes a horizontal deflection current; and Vcs denotes the end-to-end voltage of the second S-shaped capacitor 54 (the output of the voltage of the horizontal size control circuit).

In FIG. 7, the horizontal deflection output circuit 33 functions to cause the horizontal output transistor 46 to be switched on in accordance with the horizontal drive pulse VD inputted from the horizontal drive pulse input terminal 40, and to enable the horizontal deflection current IDY in a saw tooth wave shape to flow to the horizontal deflecting coil 51. When the horizontal output transistor 46 is turned off, a first resonance pulse in a sine wave shape generates at the collector on the basis of a first resonance frequency determined by the inductance LH of the horizontal deflecting coil 51 and the capacity CR1 of the first resonance capacitor 49 (collector voltage Vcp). This first resonance pulse is called a flyback pulse. Also, in the circuit illustrated in FIG. 7, a second resonance pulse in a sine wave shape generates on the basis of a second resonance frequency determined by the inductance Lm of the modulating coil 53 and the capacity CR2 of the second resonance capacitor 50 (modulation voltage Vm).

The horizontal deflection output circuit 33 illustrated in FIG. 7, in which the pulse width of said first resonance pulse and the pulse width of said second resonance pulse are set to be substantially equal, is generally called a diode modulation circuit. This diode modulation circuit can control the amplitude of the horizontal deflection current IDY by varying the end-to-end voltage Vcs of the second S-shaped capacitor 54. In the circuit illustrated in FIG. 7, the horizontal deflection current IDY is controlled, and pincushion distortion eliminated, by varying the end-to-end voltage Vcs of said second S-shaped capacitor 54 in accordance with the horizontal size control circuit 34 having the error amplifier circuit 56.

Furthermore, in the circuit illustrated in FIG. 7, an anode voltage EHV to be supplied to the anode terminal 57 of the cathode ray tube is formed by boosting the voltage of said first resonance pulse (flyback pulse Vcp) with the flyback transformer 37 and rectifying it with the diode 56. Also, the first half current of the horizontal deflection current is formed by rectifying with the diode 47 a pulse reverse in direction to this first resonance pulse.

Figure 8:
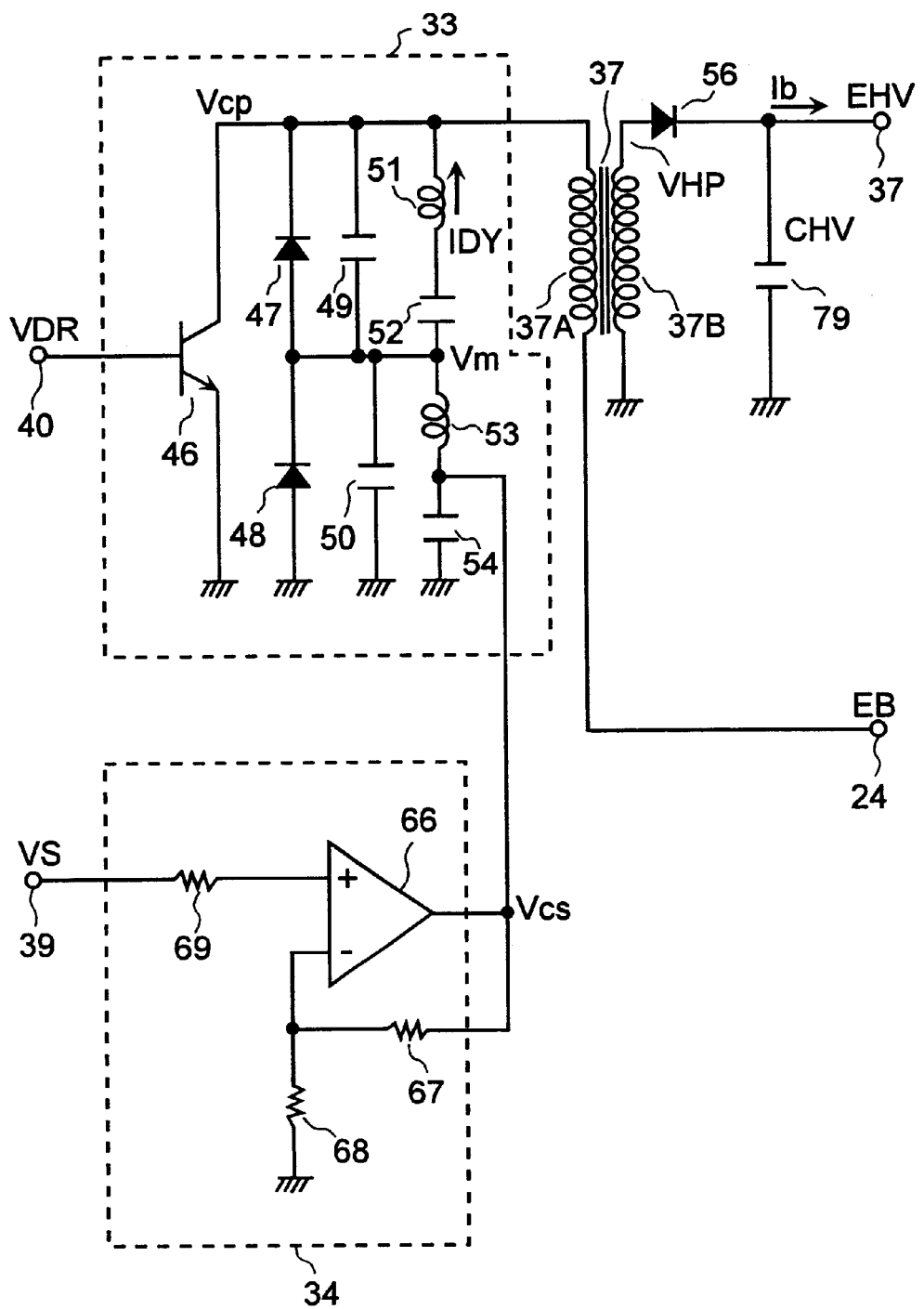
FIG. 8 is a circuit diagram illustrating a modification of the circuit diagram of FIG. 7.

The present invention can also reduce a fluctuation of an anode voltage which is supplied to the cathode ray tube 29. FIG. 8 illustrates a modification of the circuit of FIG. 7, wherein a high voltage capacitor 79 is connected at the output side of the diode 56 in parallel to the secondary winding 37 B of the flyback transformer 37. The diode 56 rectifies a high voltage pulse VHP provided by the secondary winding 37B of the flyback transformer 37 and forms the anode voltage EHV of the cathode ray tube 29. The pulse width of the high voltage pulse VHP (corresponding to a horizontal retrace interval) almost corresponds with the flyback pulse Vcp, in the circuit of FIG. 8. Therefore, as compared with a conventional display apparatus, the display apparatus of the present invention can enlarge a pulse width of the high voltage pulse VHP and the conduction period of the diode 56 is longer than the conventional display apparatus. Accordingly, a quantity of electric charge accumulated by the high voltage capacitor 79 and a capacitance between anode terminal 57 of the cathode ray tube 29 and ground during a horizontal scanning period is larger than the conventional display apparatus. Therefore, a shortage of the electric charge which arises by beam electric current Ib which is output from terminal 57 can be supplemented. That is, the quantity of the electric charge which is supplied to anode terminal 57 through diode 56 is larger in the display apparatus of the present invention than the conventional display apparatus. Therefore, the display apparatus of the present invention can suppress a reduction of the anode voltage which arises following an increase of beam electric current Ib.

Figure 9:
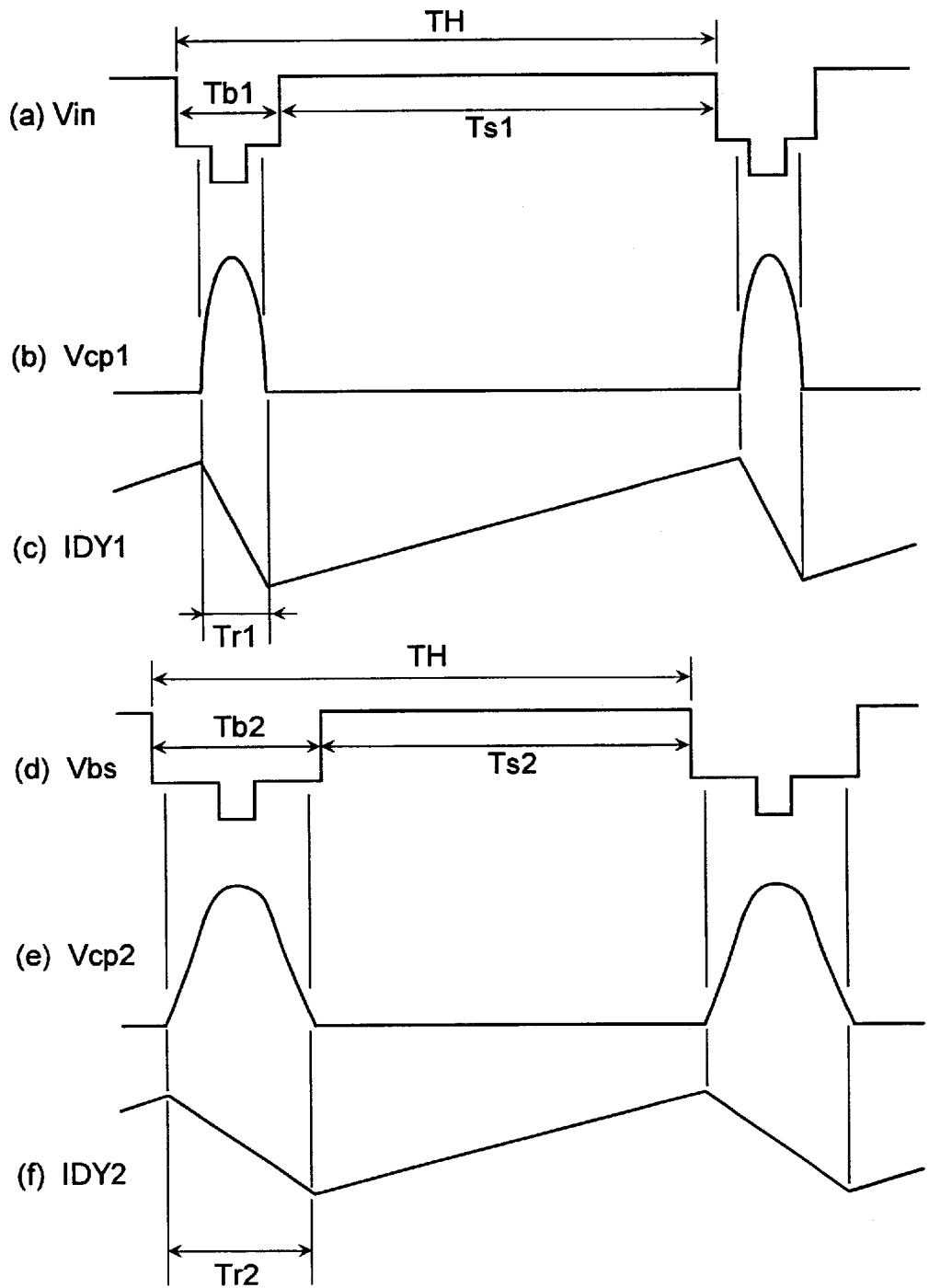
FIG. 9 shows waveform diagrams (a)–(f) of different parts of the horizontal deflection output circuit of FIG. 4.

FIG. 9 shows waveform diagrams (a)–(f) of different parts of the horizontal deflection circuit of FIG. 7. In FIG. 9, (a) is a waveform diagram of the input video signal Vin; (b), of a collector voltage Vcp1 of the horizontal output transistor 46 in the horizontal display interval and horizontal blanking interval corresponding to the input video signal Vin; (c), of a horizontal deflection current IDY1; and (d), of the converted video signal Vbs, which is the output voltage of the signal processing circuit 28. Further, (e) is a waveform diagram of a collector voltage Vcp2 of the horizontal output transistor 46 when the horizontal display interval is altered; and (f), of a horizontal deflection current IDY2 when the horizontal display interval is altered. While FIGS. 9(b) and (c) are waveform diagrams of a conventional display apparatus, FIGS. 9(e) and (f) are waveform diagrams of a display apparatus according to the present invention.

In FIGS. 9(a)–(f), TH represents the horizontal period; Ts1, the horizontal display interval of the input video signal Vin; Tb1, the horizontal blanking interval of the input video signal Vin; Tr1, the horizontal retrace line interval in the conventional display apparatus; Ts2, the horizontal display interval of the converted video signal Vbs; Tb2, the horizontal blanking interval of the converted video signal Vbs; and Tr2, the horizontal retrace line interval in the display apparatus according to the invention.

In the conventional display apparatus, the ratio of the horizontal retrace line interval Tr1 to the horizontal interval TH was set to be about 15%. The reason is that the horizontal display interval Ts1 is determined by the input video signal Vin, and the horizontal retrace line interval Tr1 is designed on the basis of this input video signal. For example, in the NTSC system, the horizontal period TH is set to be 63.5 μs, and the horizontal display interval Ts1, 52.7 μs. Consequently, the horizontal blanking interval Tb1 becomes 10.8 μs, and the ratio of the horizontal blanking interval Tb1 to the horizontal period TH (Tb1/TH), 17%. As a result, for the conventional display apparatus, when setting the ratio of the horizontal retrace line interval Tr1 to the horizontal period TH (Tr1/TH), Tr1/TH is set to be approximately equal to about 15%, with a tolerance of about 2%, so as to permit a Tr1/TH ratio of 17%.

By contrast, in the display apparatus according to the present invention illustrated in FIG. 4, the signal processing circuit 28 enables the horizontal display interval Ts2 of the converted video signal Vbs to be set to any desired value as shown in FIG. 9(d). As a result, the horizontal retrace line interval Tr2 does not depend on the horizontal display interval Ts1 of the input video signal Vin, and can be set to any desired value by converting the signal to the converted video signal Vbs.

In the horizontal deflection circuit 27, the horizontal deflection current IDY2 can be reduced as the horizontal retrace line interval Tr2 is extended, so that the power consumption in the horizontal deflection output circuit 33 can be decreased. The actions of the horizontal deflection circuit 33 can be represented by the following basic equations, Equation 1 to Equation 4. In Equation 1 to Equation 4, Vcp is the collector voltage of the transistor 46; EB, the power supply voltage; TH, the horizontal period; LH, the inductance of the horizontal deflecting coil; IDY, the horizontal deflection current; Tr, the horizontal retrace line interval; PH, the horizontal deflection power index; VDY, the end-to-end voltage of the first S-shaped capacitor 52; and Vcs, the end-to-end voltage of the second S-shaped capacitor 54.

$$Vcp = EB(\pi/2 \times (TH/Tr - 1) + 1) \quad \text{Equation 1}$$

$$EB = LH \times IDY/(TH - Tr) \quad \text{Equation 2}$$

$$PH = LH \times IDY^2 \quad \text{Equation 3}$$

$$EB = VDY \times Vcs \quad \text{Equation 4}$$

In Equation 1 to Equation 4, the horizontal period TH is determined by the specification of the signals that are inputted; the horizontal deflection power index PH, by the specification of the deflecting yoke; and the end-to-end voltage of the second S-shaped capacitor 54, by the operational margin of the circuit. For example, where NTSC signals are to be inputted to and displayed in a progressive system on a wide aspect television set of about 32-inch size, the horizontal period TH will be 31.8 μs; the horizontal deflection power index PH, 40 mHA$^2$, and the end-to-end voltage of the second S-shaped capacitor 54, 10 V. Substituting these values in the foregoing four equations to determine the relationships of the ratio of the horizontal retrace line interval Tr to the horizontal period TH, Tr/TH, to the power supply voltage EB, the inductance LH of the horizontal deflecting coil, and the horizontal deflection current IDY, the relationships can be represented as illustrated in FIGS. 10–15.

Figure 10:
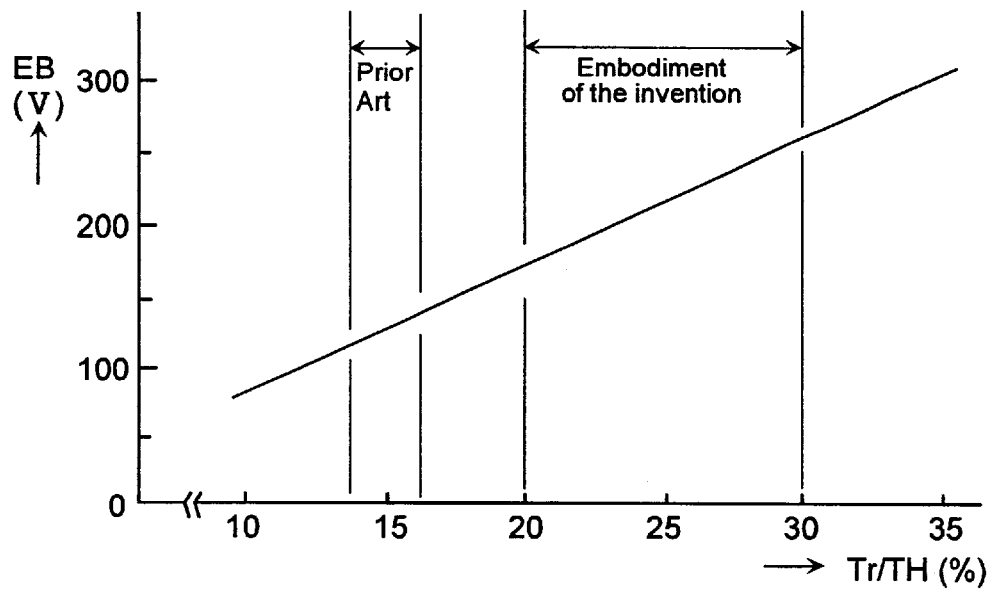
FIG. 10 is a characteristic diagram of the power supply voltage relative to the ratio of the horizontal retrace line interval to the horizontal period.
Figure 11:
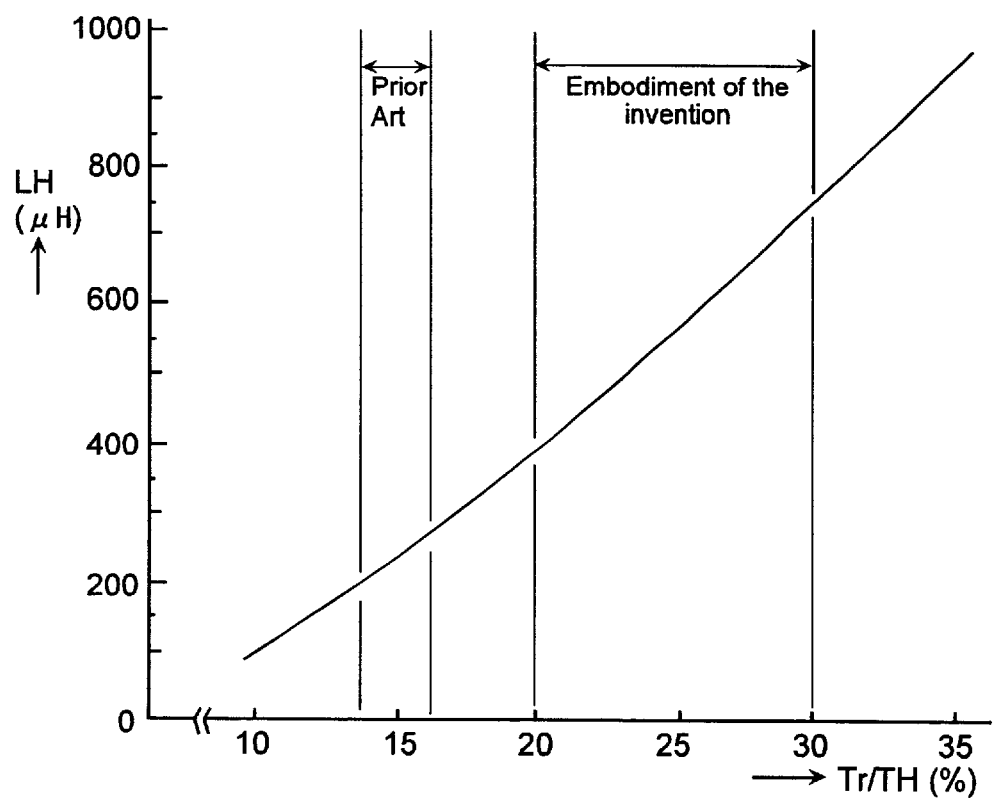
FIG. 11 is a characteristic diagram of the inductance of the horizontal deflection coil relative to the ratio of the horizontal retrace line interval to the horizontal period.
Figure 12:
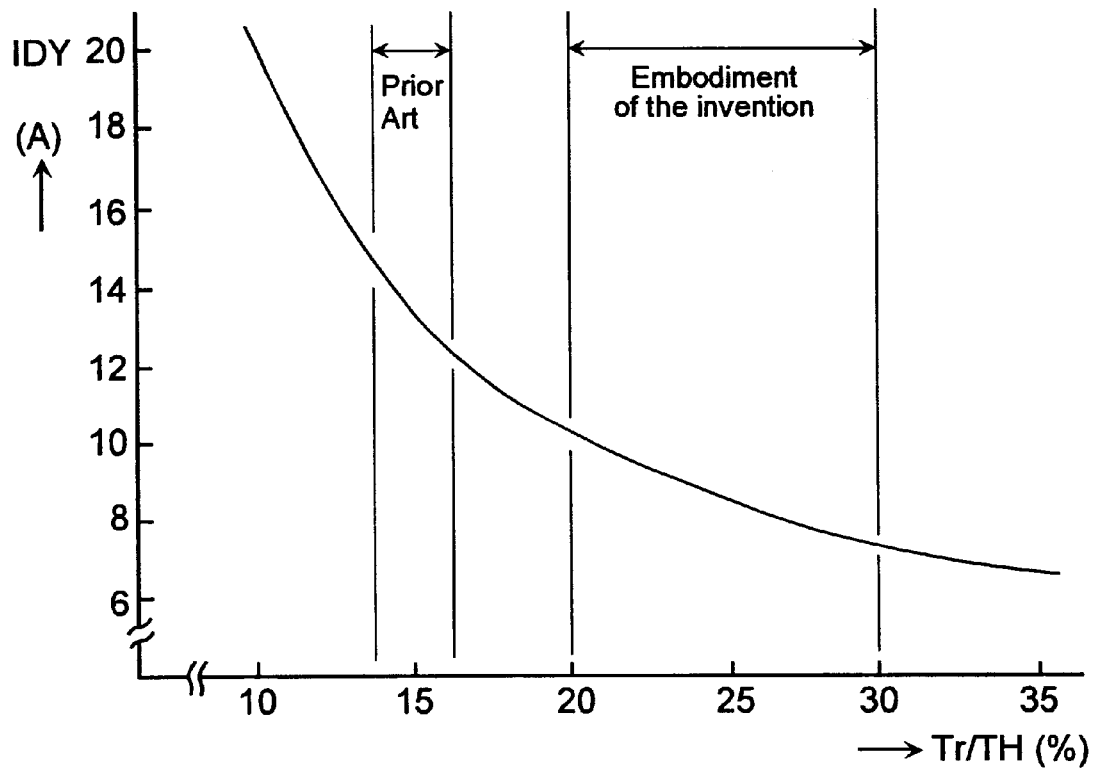
FIG. 12 is a characteristic diagram of the deflection current relative to the ratio of the horizontal retrace line interval to the horizontal period.
Figure 13:
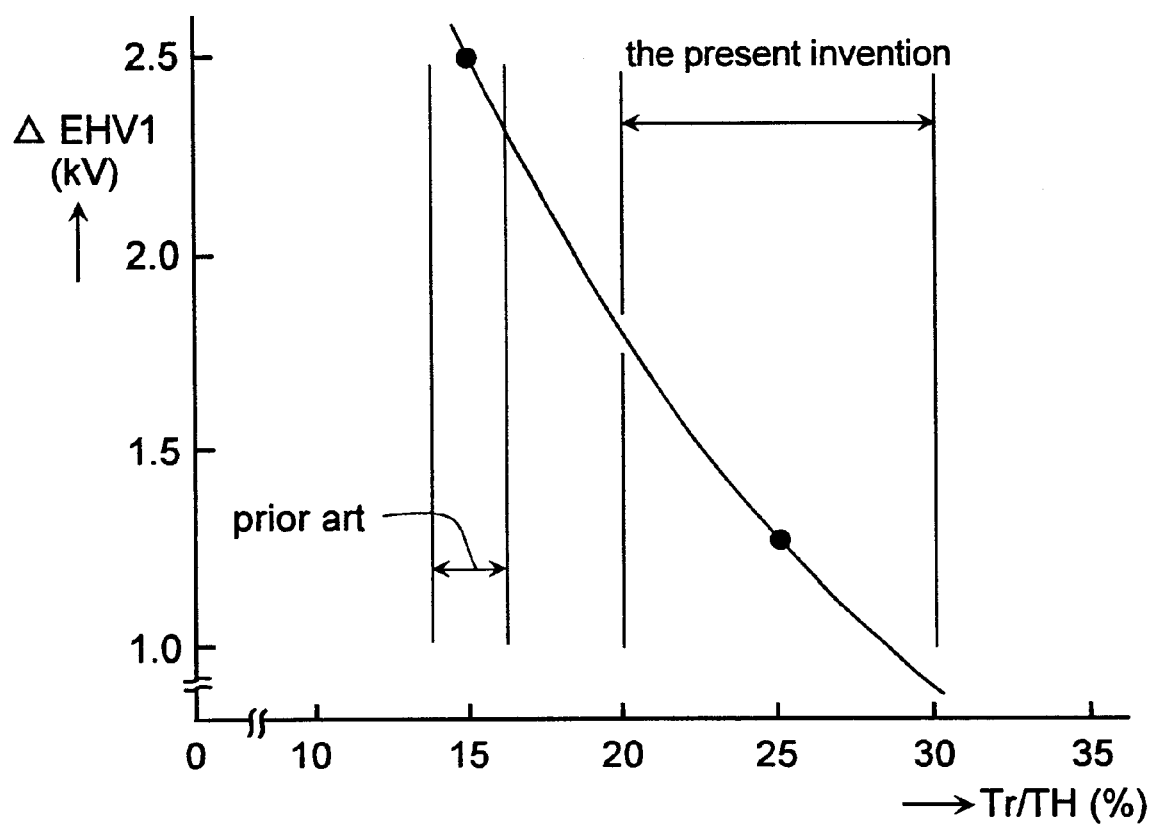
FIG. 13 is a characteristic diagram of the static regulation characteristics relative to the ratio of the horizontal retrace line interval to the horizontal period.
Figure 14:
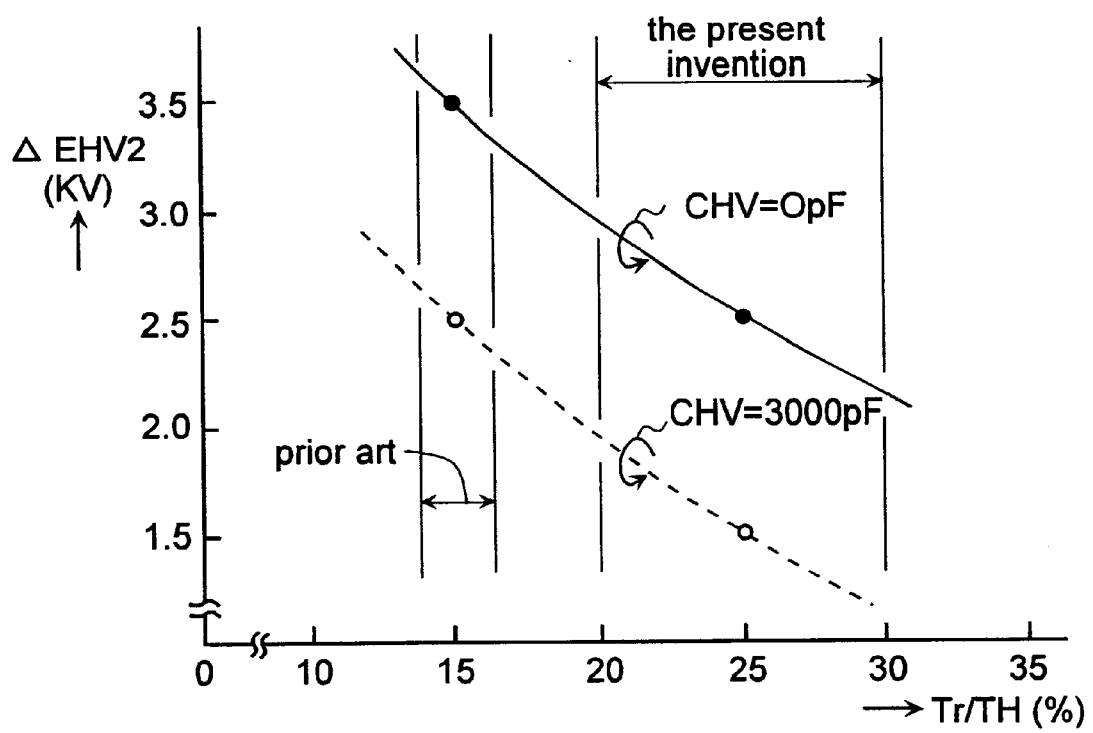
FIG. 14 is a characteristic diagram of the dynamic regulation characteristics relative to the ratio of the horizontal retrace line interval to the horizontal period.
Figure 15:
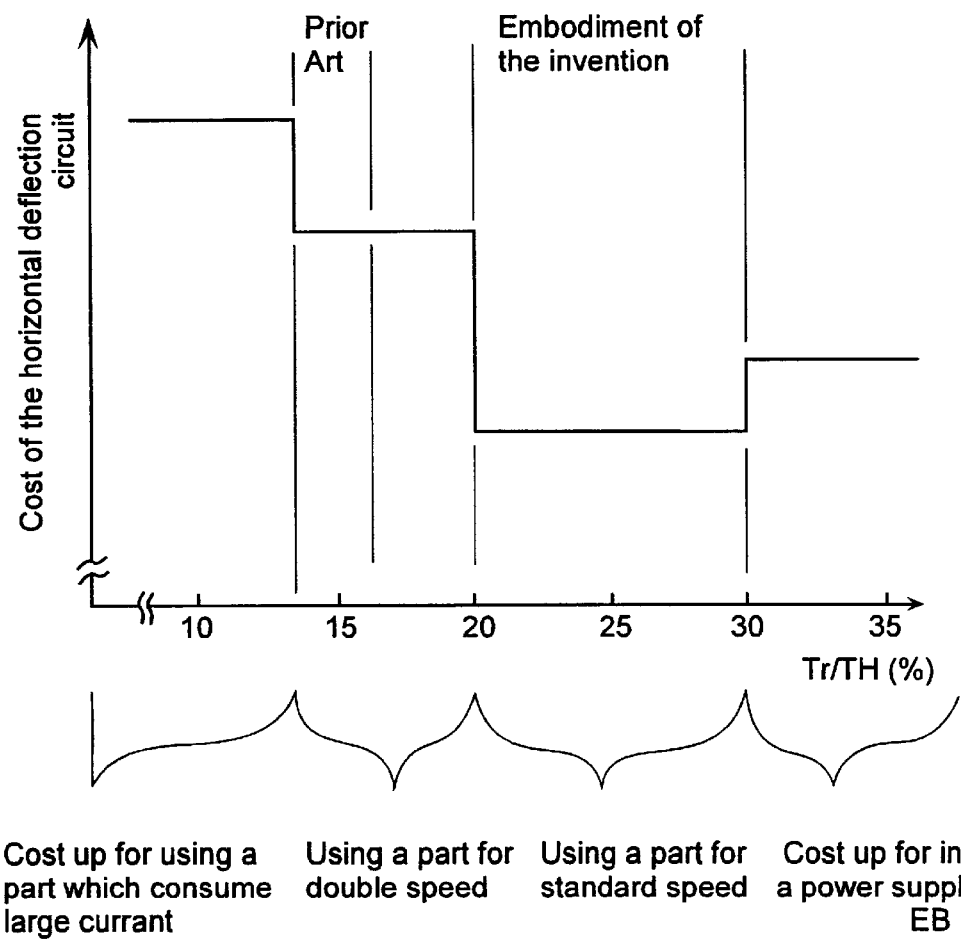
FIG. 15 is a characteristic diagram of the cost of the horizontal deflection circuit relative to the ratio of the horizontal retrace line interval to the horizontal period.

FIG. 10 is a characteristic diagram of the power supply voltage relative to the ratio of the horizontal retrace line interval to the horizontal period; FIG. 11 is a characteristic diagram of the inductance of the horizontal deflecting coil relative to the ratio of the horizontal retrace line interval to the horizontal period; FIG. 12 is a characteristic diagram of the deflection current relative to the ratio of the horizontal retrace line interval to the horizontal period; FIG. 13 is a characteristic diagram which shows static regulation characteristics relative to the ratio of the horizontal retrace line interval to the horizontal period; FIG. 14 is a characteristic diagram which shows dynamic regulation characteristics relative to the ratio of the horizontal retrace line interval to the horizontal period; and FIG. 15 is a characteristic diagram of the cost of the horizontal deflection circuit relative to the ratio of the horizontal retrace line interval to the horizontal period. In these diagrams, the horizontal axis represents the ratio of the horizontal retrace line interval Tr to the horizontal period TH, Tr/TH. The vertical axis or ordinate represents the power supply voltage EB (V) in FIG. 10, the inductance LH (pH) of the horizontal deflecting coil 31 in FIG. 11, the deflection current IDY (A) in FIG. 12, the fluctuation of the anode voltage in the static state (ΔEHV1) in FIG. 13, the fluctuation of the anode voltage in the dynamic state (ΔEHV2) in FIG. 14, and the cost of the horizontal deflection circuit in FIG. 15. The ratio of the horizontal retrace line interval Tr to the horizontal period TH, Tr/TH, which is set between 20% and 30% in accordance with the present invention is shown in FIG. 10 to FIG. 15, and this range is indicated for the embodiment of the present invention.

It is seen that, as shown in FIGS. 10–15, in the display apparatus according to the invention, by increasing the ratio Tr/TH of the horizontal retrace line interval Tr to the horizontal period, the power supply voltage ED and the inductance LH of the horizontal deflecting coil 51 can be raised, and the horizontal deflection current IDY can be reduced. For example, it is apparent that, in the circuit illustrated in FIG. 4, if the ratio Tr/TH of the horizontal retrace line interval Tr to the horizontal period TH is set to be at least 20% or above, the horizontal deflection current IDY can be reduced from 13.3 A to 10.2 A or less.

When a horizontal frequency of the signal outputted from a signal processing circuit is set to be about 31.5 kHz, the horizontal retrace line interval in the horizontal deflection circuit is set to be about 6.3 μs. Further, when the horizontal frequency of the signal outputted from the signal processing circuit is set to be about 33.75 kHz, then the horizontal retrace line interval in the horizontal deflection circuit is set to be about 5.9 μs.

By reducing the horizontal deflection current IDY, the currents flowing to the horizontal output transistor 46 and the damper diode 47 and the like can be reduced, and the power consumption of the horizontal deflection output circuit 13 can be reduced.

However, raising the power supply voltage EB would necessitate increasing the voltage-resistance of the power supply circuit generating the power supply voltage EB, and the switching transformer and the smoothing capacitor would have to be increased in size.

FIG. 13 shows a relation of Tr/Th (%) and a difference of the anode voltage when the whole screen is displayed in black and the anode voltage when the whole screen is displayed in white. The difference represents the static fluctuation of the anode voltage, that is, ΔEHV1 is apparent from FIG. 13 that ΔEHV1 can be reduced 2.5 kV to 1.3 kV by changing the Tr/TH (%) from 15% to 25%.

FIG. 14 shows a relation of Tr/TH (%) and the dynamic fluctuation of anode voltage (EHV2) when displayed as a white window (central portion of screen displayed in white, and other than the central portion of the screen being displayed black). In FIG. 14, the broken line shows characteristics of when the capacitance CHV of the high voltage capacitor 79 in FIG. 8 is 3000 pF, and the solid 79 is 0pF (as shown in FIG. 7 where the high voltage capacitor 79 is omitted). However, even when CHV is 0, an internal capacitance of the cathode ray tube 29 and other floating capacitance exists between the anode terminal 57 of the cathode ray tube 29 and ground.

When the capacitance CHV of the high voltage capacitor 79 is 3000 pF, it is apparent from FIG. 14 that ΔEHV2 can be reduced from 2.5 kV to 1.5 kV by changing Tr/TH(%) from 15% to 25%. And when the capacitance CHV of the high voltage capacitor 79 is 0 pF (when the high voltage capacitor 79 is omitted), it is apparent that ΔEHV2 can be reduced from 3.5 kV to 2.5 kV by changing Tr/TH% from 15% to 25%. Therefore, ΔEHV2 when Tr/TH(%) is 15% and the capacitance CHV of the high voltage capacitor 79 is 3000 pF, and ΔEHV2 when Tr/TH(%) is 25% and the capacitance CHV of the high voltage capacitor 79 is 0pF (when the high voltage capacitor 91 is omitted) become substantially equal. Therefore, even if the capacitance CHV of the high voltage capacitor 79 is reduced from 3000 pF to 0pF, the dynamic regulation characteristics (EHV2) of the anode voltage is substantially not changed by the expanding of Tr/TH(%) from 15% to 25%. Therefore, in case the dynamic regulation characteristics ΔEHV2 of an anode voltage can be made equal with the past, it is possible in accordance with the present invention to reduce the capacitance CHV of the high voltage capacitor 79 or to omit the high voltage capacitor 91.

In the embodiment of the invention illustrated in FIG. 4, the Tr/TH ratio of the horizontal retrace line interval Tr to the horizontal period TH is set to be not less than 20% and not more than 30% as a practical range which enables low cost for the horizontal deflection circuit in that low cost parts may be utilized due to mass production while additionally reducing power consumption, as illustrated in the characteristic diagram of FIG. 15 showing the relation of Tr/TH ratio and cost of the horizontal deflection circuit.

Furthermore, by setting the power supply voltage to between about 200 V and 250 V would have the additional effect of making it possible to use it in common with the power supply voltage for the video circuit 25 in FIG. 4.

As described in connection with the foregoing embodiment, power consumption in the horizontal deflection circuit 27 is reduced by converting the horizontal display interval of the input video signal Vin in the signal processing circuit 28 and configuring the horizontal deflection output circuit 33 to be adaptable to the converted video signal Vbs.

Figure 16:
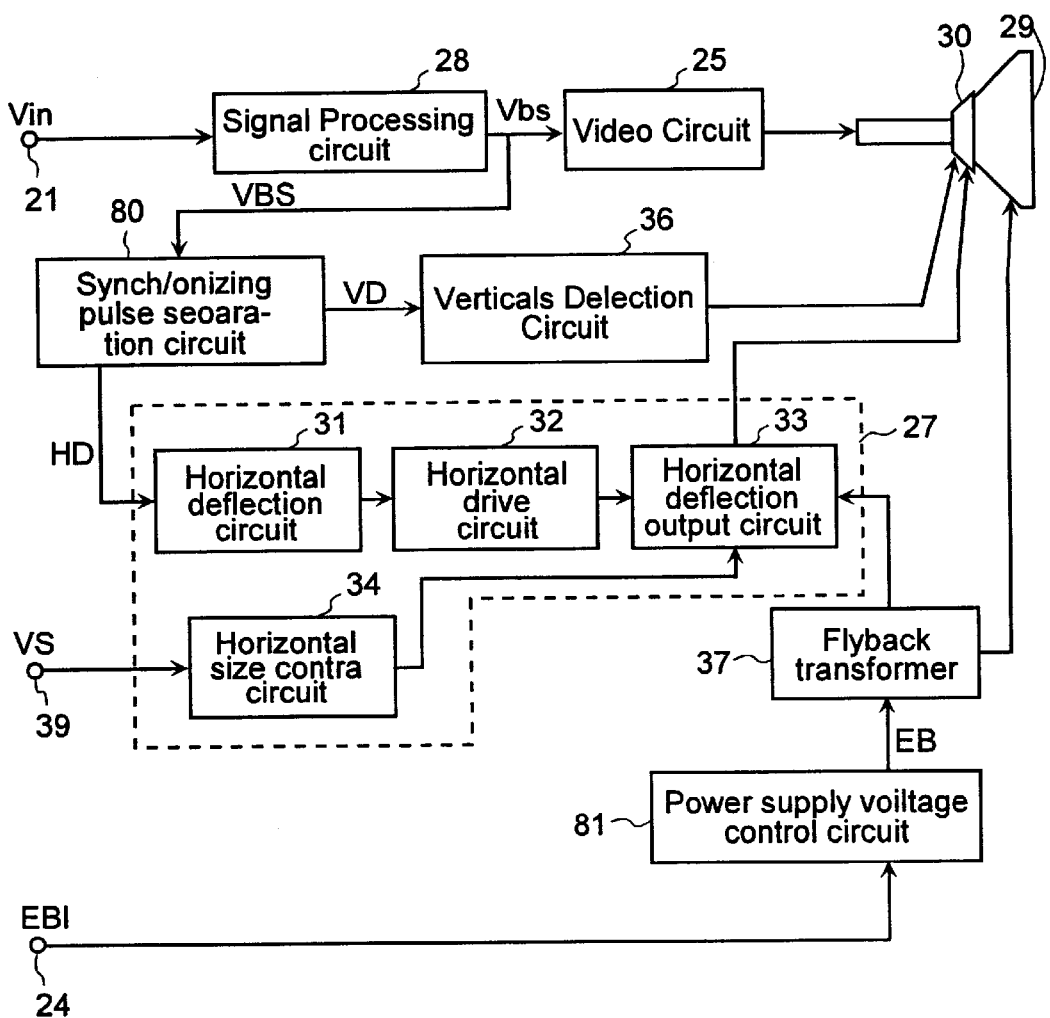
FIG. 16 is a block diagram illustrating a further embodiment of the display apparatus according to the present invention.

FIG. 16 is a block diagram illustrating a second embodiment of the display apparatus according to the invention, wherein numeral 80 denotes a synchronizing pulse separation circuit; 86, a power supply voltage control circuit; and EBI, a power supply voltage to be supplied to the power supply voltage control circuit 86. In the circuit illustrated in FIG. 16, the installation of the synchronizing signal separating circuit 80 and the power supply voltage control circuit 86 differentiates this embodiment from the block diagram shown in FIG. 4.

In FIG. 16, the synchronizing pulse separation circuit 80 detects and separates the horizontal synchronizing signal HD and the vertical synchronizing signal VD, superposed over the converted video signal Vbs outputted from the signal processing circuit 28, and supplies them to the horizontal deflection circuit 27 and the vertical deflection circuit 26, respectively. Therefore, the operating frequencies of the horizontal deflection circuit 27 and the vertical deflection circuit 26 do not depend on the horizontal frequency and the vertical frequency of the input video signal Vin, but rather these circuits operate by the horizontal frequency and the vertical frequency of the converted video signal Vin outputted from the signal processing circuit 28.

Figure 17:
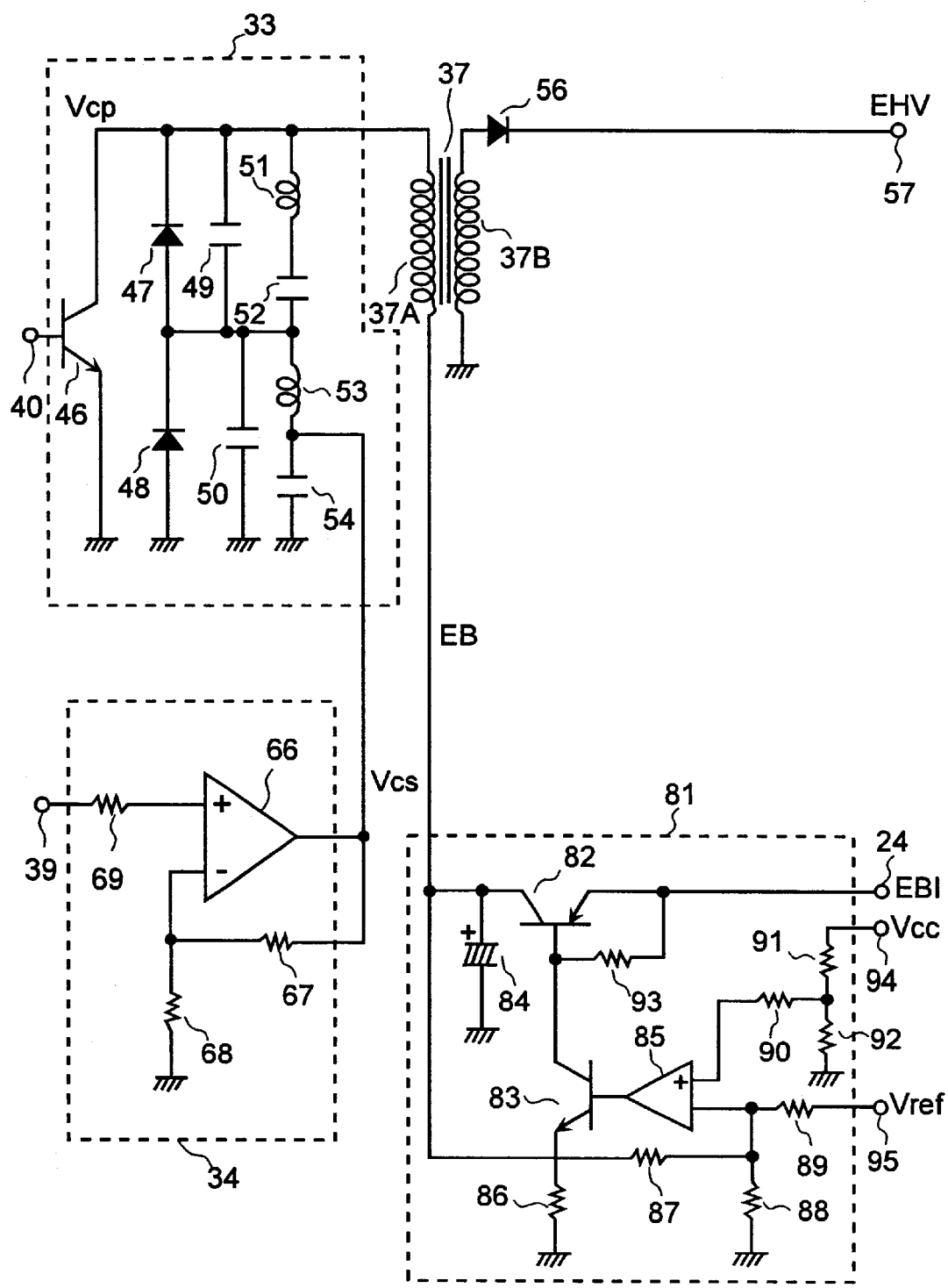
FIG. 17 is a circuit diagram of the horizontal deflection output circuit, the horizontal size control circuit and the power supply voltage control circuit in FIG. 16.

Specific examples of the horizontal deflection output circuit 33, the horizontal control circuit 34 and the power supply voltage control circuit 86 in FIG. 16 are illustrated in FIG. 17, which shows a circuit diagram of the horizontal deflection output circuit 34, the horizontal size control circuit 34 and the power supply control circuit 81. In FIG. 13, numeral 94 denotes a power supply voltage input terminal; 95, an anode voltage control signal input terminal, and the power supply voltage control circuit 81 consists of transistors 82 and 83, a capacitor 84, an error amplifier circuit 85, and resistors 86, 87, 88, 89, 90, 91, 92 and 93. Further, VCC denotes a power supply voltage, and Vref, an anode voltage control signal.

In FIG. 16, in the power supply voltage control circuit 81, the error amplifier circuit 85, the transistor 83 and the transistor 82 are operated on the basis of the anode voltage control signal Vref. Therefore, the voltage supply voltage EB supplied to the horizontal deflection output circuit 33 via the primary winding 37A of the flyback transformer 37 can be controlled with the anode voltage control signal Vref. By varying this anode voltage control signal Vref correspondingly to the horizontal frequency, the power supply voltage EB can be varied correspondingly to the horizontal frequency, and the anode voltage VHV can be kept stable.

In the circuit illustrated in FIG. 16, the installation of the synchronizing pulse separation circuit 80 and the power supply voltage control circuit 81 makes it possible to accomplish horizontal deflection and vertical deflection which do not depend on the horizontal frequency and the vertical frequency of the input video signal Vin, but rather in accordance with the horizontal frequency and the vertical frequency of the converted video signal Vbs outputted from the signal processing circuit 28. Further, since the horizontal display interval can be converted by the signal processing circuit 28 as in the embodiment of the present invention illustrated in FIG. 4, the ratio Tr/TH of the horizontal retrace line interval Tr to the horizontal period TH in the horizontal deflection circuit 27 can be expanded compared with the prior art, making it possible to reduce power consumption through reduction of the horizontal deflection current IDY.

By using the embodiment of the invention illustrated in FIG. 16, there can be achieved the effect of enabling the horizontal deflection circuit 27 and the vertical deflection circuit 26 to be operated at any desired horizontal frequency and vertical frequency, i.e. the frequencies of the converted video signal Vbs in addition to this effect of the embodiment of the invention illustrated in FIG. 4.

Figure 18:
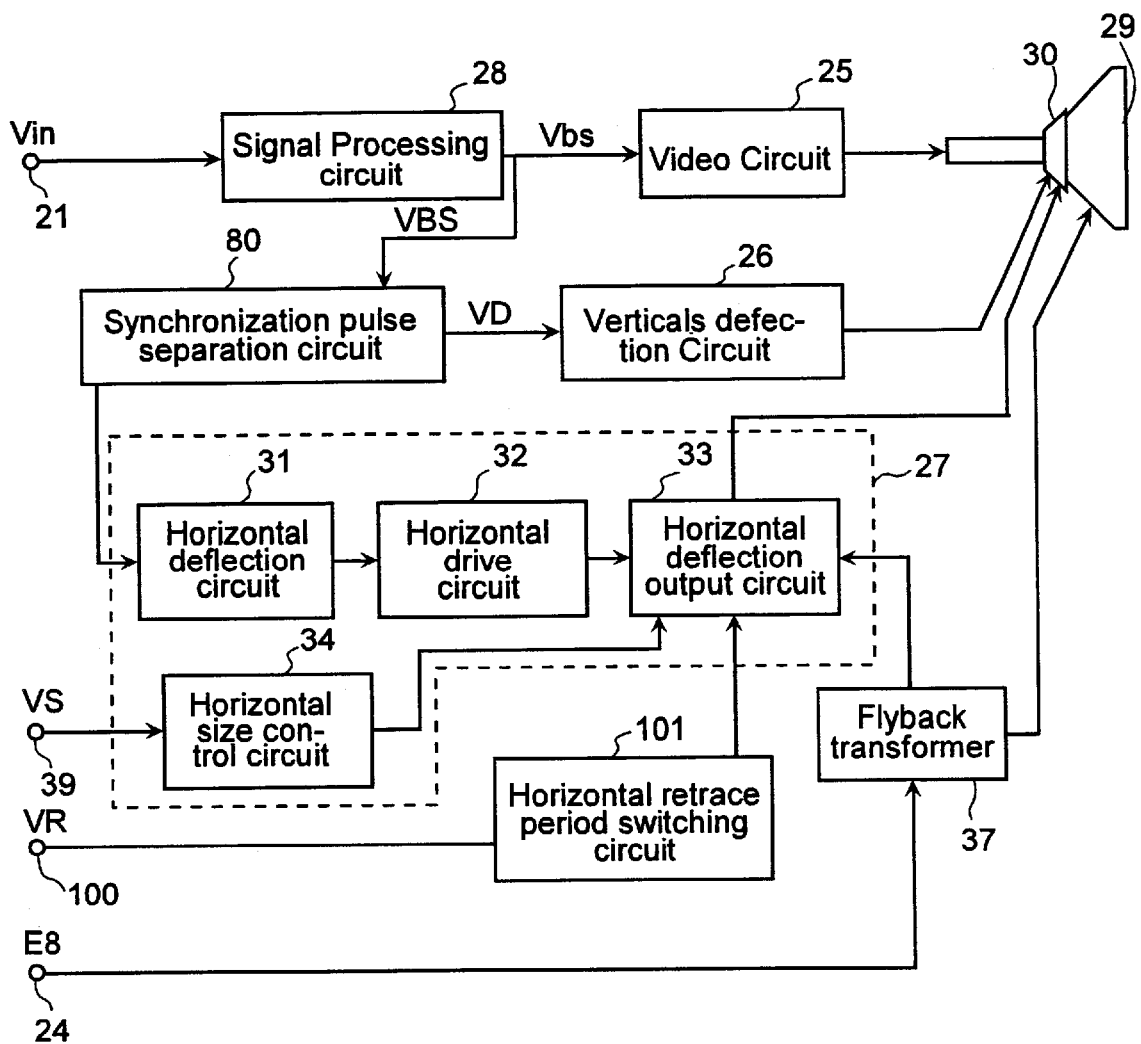
FIG. 18 is a block diagram illustrating another embodiment of the display apparatus according to the present invention.

A further embodiment of the present invention is illustrated in FIG. 18, wherein 80 is a synchronizing pulse separation circuit, 100 is a horizontal retrace interval switching signal input terminal, 101 is a horizontal retrace interval switching circuit, VR is a horizontal retrace interval switching signal which is obtained on the basis of converted video signal Vbs. In FIG. 18, the separation circuit 80 detects and separates the horizontal synchronous signal HD and the vertical synchronous signal VD which are superposed in the converted video signal Vbs which is output from the signal processing circuit 28, and supplies the horizontal deflection circuit 27 and the vertical deflection circuit 26, the horizontal synchronous signal HD and vertical synchronous signal VD. Therefore, an operation frequency of the horizontal deflection circuit 27 and the vertical deflection circuit 26 are not a horizontal frequency and a vertical frequency of the inputted video signal Vin, but rather a horizontal frequency and a vertical frequency of the converted video signal Vbs which is output from the signal processing circuit 28. That is, the horizontal deflection circuit 27 and the vertical deflection circuit 26 are operated by the horizontal frequency and the vertical frequency of the converted video signal Vbs.

An embodiment of the horizontal deflection output circuit 33, the horizontal size control circuit 34, and the horizontal retrace interval switching circuit 101 is shown in FIG. 15, wherein 102 is a capacitor and 103 is a relay switch of the horizontal retrace interval switching circuit. The relay switch 103 is turned on or off by the horizontal retrace period switching signal VR which is input from the horizontal retrace period switching signal input terminal 100. When the relay switch 103 is turned on, the capacitor 102 is connected in parallel with the resonant capacitor 49. Therefore, when the relay switch 103 is turned on, the parallel capacitance of the resonant capacitor 49 and the capacitor 102 becomes smaller than the resonant capacitor 29. Therefore, a horizontal resonant frequency of a resonant circuit which is determined by the resonance of the parallel capacitance and the horizontal deflection coil is enlarged. Consequently, when the relay switch 103 is turned on, the horizontal retrace period which corresponds to a half of a resonant period of the horizontal resonant circuit can be lengthened.

Figure 19:
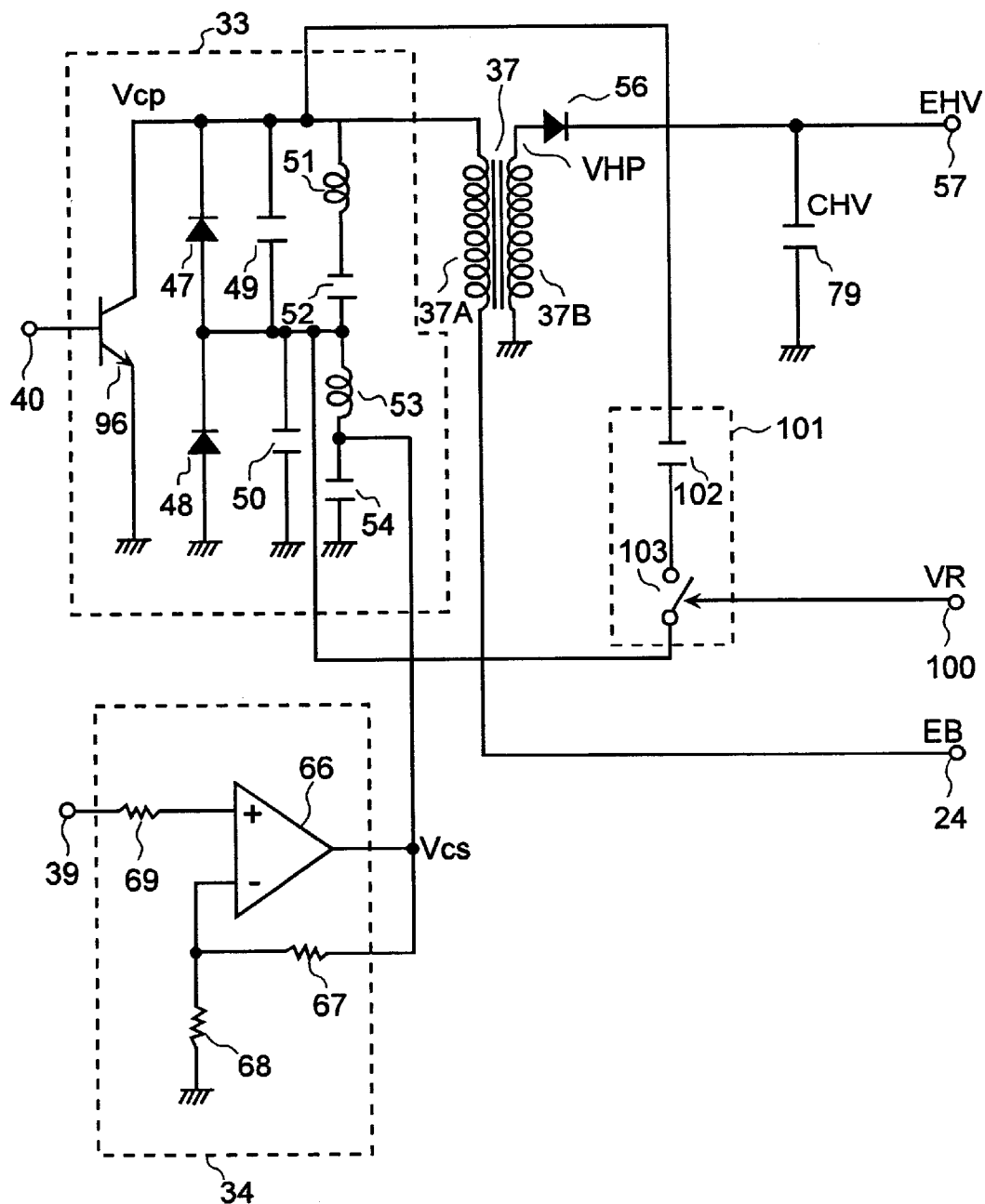
FIG. 19 is a circuit diagram of the horizontal deflection output circuit, the horizontal size control circuit and the power supply voltage control circuit in FIG. 18.

The circuit shown in FIG. 19 operates in the following manner. When a horizontal frequency is high (for example, when receiving the HDTV signal), the relay switch 103 is turned off, and when a horizontal frequency is low (for example, when receiving the NTSC signal), the relay switch 103 is turned on. Consequently, the ratio of horizontal retrace period Tr to the horizontal period TH can be greatly changed from that of the prior art even when displaying a different horizontal frequency of the video signals. Therefore, the regulation characteristics of the anode voltage can be improved more even when displaying a different horizontal frequency of the video signals. Furthermore, a maximum value of a collector voltage of the horizontal output transistor 46 and the anode voltage EHV which is output from the anode voltage output terminal 57 can be made substantially constant by adjusting the capacitance value of the capacitor 102 in the circuit shown in FIG. 19, even when displaying a different horizontal frequency of the video signals.

That is, even when capacitor 102 is not set, if the horizontal frequency is high, the rate of Tr/TH(%) is large. However, when a horizontal frequency is low, the ratio of Tr/TH(%) is small, and the regulation characteristics of the anode voltage deteriorate. This becomes a factor of screen fluctuation. However, when receiving a video signal of the progressive scan type having a low horizontal frequency, the fluctuation of the anode voltage can be improved by the provision of the capacitor 102 connected in parallel to the resonant capacitor 49. Further, the same effect can be obtained when using a semiconductor switch, such as a power MOSFET or a bipolar transistor as a substitute for the relay switch 103, shown in FIG. 19.

Although the foregoing description referred to television signals of the NTSC system as input video signals, the invention is applicable to television signals of the PAL and SECAM systems, television signals of an HDTV system, video signals outputted from a computer and the like and is not limited by the type of input video signals.

These signals (television signals of the NTSC, PAL, SECAM and HDTV systems, and video signals outputted from a computer) differ from one another in horizontal blanking interval. They can be set to a substantially equal horizontal blanking interval by utilizing the signal processing circuit according to the invention. Therefore, the ratio of the horizontal retrace line interval to the horizontal period in the horizontal deflection circuit 7 can be set to substantially equal values. Accordingly, the above-mentioned different signal specifications can be addressed by the same display apparatus.

On the other hand, video signals outputted from the external output terminal of a liquid crystal notebook type personal computer may have a shorter horizontal blanking interval than a desktop personal computer, which presupposes the use of a cathode ray tube for the display unit. By utilizing the signal processing circuit according to the invention, an appropriate horizontal blanking interval can be set. Therefore, the ratio of the horizontal retrace line interval to the horizontal period in the horizontal deflection circuit can be set to an appropriate value.

In the display apparatus according to the present invention, a signal processing circuit for converting the horizontal display interval of the input video signal is provided before the video circuit, and the ratio of the horizontal retrace line interval to the horizontal period is set in the horizontal deflection circuit on the basis of the converted video signal outputted from this signal processing circuit. Therefore, the ratio of the horizontal retrace line interval to the horizontal period can be set greater than according to the prior art. As a result, the horizontal deflection current can be reduced, and power consumption in the horizontal deflection circuit can be reduced.

What is claimed is:

1. A display apparatus comprising:

signal processing means for compressing a display period in a horizontal scanning period of an input video signal and for expanding a blanking period of the horizontal scanning period of the input video signal and provides an output thereof; and horizontal retrace interval expansion means for expanding a horizontal retrace interval of a horizontal deflection current for a display device in accordance with the expanded blanking period expanded by the signal processing means;

wherein a display device displays the video signal in accordance with an output of the signal processing means and the horizontal retrace interval expansion means.

2. A display apparatus according to claim 1, wherein the horizontal retrace interval expansion means includes a horizontal deflection current output means for outputting a horizontal deflection current having a horizontal retrace line interval which is larger than a horizontal retrace line interval for the inputted video signal in accordance with the expanded blanking period expanded by the signal processing means, the display device displaying the video signal in accordance with the output of the signal processing means and the horizontal deflection current output means.

3. A display apparatus according to claim 2, wherein a ratio of the horizontal retrace line interval to a horizontal period of the displayed video signal is at least 20%.

4. A display apparatus according to claim 3, wherein the ratio of the horizontal retrace line interval to the horizontal period is in a range of 20% to 30%.

5. A display apparatus comprising:
a cathode ray tube having a deflection coil;
a signal processing circuit which compresses a display period in a horizontal scanning period of an input video signal and which expands a blanking interval of the horizontal scanning period of the video signal, the signal processing circuit providing an output of the video signal to the cathode ray tube; and
a horizontal retrace interval expansion circuit which expands a horizontal retrace line interval of a horizontal deflection current for the deflection coil of the cathode ray tube in accordance with the blanking period expanded by the signal processing circuit;
wherein the cathode ray tube displays the input video signal in accordance with the output of the signal processing circuit and the output of the horizontal retrace interval expansion circuit.

6. A display apparatus according to claim 5, wherein the horizontal retrace interval expansion circuit includes a horizontal deflection current output circuit connected to a horizontal deflection coil of the cathode ray tube, the horizontal deflection current output circuit outputting a horizontal deflection current having a horizontal retrace line interval which is larger than a horizontal retrace line interval for the inputted video signal in accordance with the expanded blanking period expanded by the signal processing circuit.

7. A display apparatus according to claim 6, wherein a ratio of the horizontal retrace line interval to a horizontal period of the displayed video signal is at least 20%.

8. A display apparatus according to claim 7, wherein the ratio of the horizontal retrace line interval to the horizontal period is i n a range of 20% to 30%.

9. A display apparatus according to claim 6, wherein the display apparatus is a television, and the signal processing circuit includes a memory for storing the inputted video signal, a conversion circuit which writes the video signal into the memory at a first write-in frequency and which reads out the video signal stored in the memory at a second read-out frequency different from the write-in frequency and which increases the read-out frequency in accordance with the extension of the blanking interval.

10. A display apparatus according to claim 9, wherein when a blanking ratio before extending the blanking interval of the video signal is $\alpha$, and a rate of extension of the blanking interval is n, the read-out frequency of the conversion circuit is increased to about $(1-\alpha)/(1-n\alpha)$ times the write-in frequency.

11. A display apparatus according to claim 6, wherein the display apparatus is a wide aspect television and the cathode ray tube is a wide aspect cathode ray tube, the signal processing circuit including an I/P conversion circuit for converting a standard aspect inputted video signal of an interlaced scanning system into a video signal of a progres-sive scanning system, a wide conversion circuit for converting an aspect ratio of the video signal converted to the progressive scanning system into a wide aspect ratio, and further comprising a system controller for controlling the horizontal retrace interval expansion circuit so as to extend the horizontal retrace line interval.

12. A display apparatus according to claim 6, wherein the display apparatus is a wide aspect television and the cathode ray tube is a wide aspect cathode ray tube, the signal processing circuit receiving an inputted video signal of one of a standard aspect television signal, a wide aspect television signal and a standard aspect PC signal, the signal processing circuit including a conversion circuit for converting the aspect ratio of one of a standard aspect video signal and a standard aspect PC signal into a wide aspect ratio signal, and further comprising a system controller for controlling the horizontal retrace interval expansion circuit to extend the horizontal retrace interval.

13. A display apparatus according to claim 12, wherein the horizontal period expansion circuit includes a deflection control circuit for the horizontal deflection current output circuit for extending the horizontal retrace line interval by extending the horizontal blanking interval of the video signal, the signal processing circuit including a memory for storing a wide aspect signal, the conversion circuit enabling writing-in of the video signal into the memory at a write-in frequency and reading-out of the stored video signal from the memory at a read-out frequency different from the write-in frequency, wherein the read-out frequency is increased in accordance with the extension of the horizontal blanking interval.

14. A display apparatus according to claim 6, further comprising a video circuit responsive to the signal processing circuit for driving a cathode electrode of the cathode ray tube, and a vertical deflection circuit for driving a vertical deflecting coil of the cathode ray tube.

15. A display apparatus according to claim 14, wherein a ratio of the horizontal retrace line interval to a horizontal period of the displayed video signal is at least 20%.

16. A display apparatus according to claim 14, wherein the ratio of the horizontal retrace line interval to the horizontal period is in a range of 20% to 30%.

17. A display apparatus according to claim 14, wherein a horizontal frequency of the signal outputted from the signal processing circuit is set to be about 31.5 kHz, and the horizontal retrace line interval in the horizontal deflection circuit is set to be at least 6.3 $\mu$s.

18. A display apparatus according to claim 14, wherein a horizontal frequency of the signal outputted from the signal processing circuit is set to be about 33.75 kHz, and the horizontal retrace line interval in the horizontal deflection circuit is set to be at least 5.9 $\mu$s.

19. A display apparatus according to claim 14, wherein a power supply voltage of the video circuit for driving the cathode electrode of the cathode ray tube is substantially equal to a power supply voltage of the horizontal deflection output circuit of the horizontal blanking period expansion circuit.

20. A display apparatus according to claim 14, wherein the signal processing circuit includes a time axis conversion circuit for changing a ratio of the horizontal display interval to the horizontal period of the input video signal.

21. A display apparatus according to claim 14, wherein the signal processing circuit includes an I/P conversion circuit for converting a video signal of an interlaced scanning system into a video signal of a progressive scanning system, and a time axis conversion circuit for changing a ratio of the horizontal display interval to the horizontal period of the I/P-converted video signal.

22. A display apparatus according to claim 14, further comprising a synchronizing pulse separation circuit which separates a synchronizing signal from the output of the signal processing circuit for supply to the horizontal deflection circuit.

23. A display apparatus according to claim 14, wherein power supply voltages of the horizontal deflection circuit and the video circuit are substantially equal.

24. A display apparatus according to claim 14, further comprising a variable power supply circuit for supplying power via a primary winding of a flyback transformer of the horizontal deflection circuit.

25. A display apparatus according to the 24, wherein the output voltage of the variable power supply circuit low varies in accordance with an anode voltage control signal.

* * * * *